US 10,419,926 B2

United States Patent
Chen et al.

(10) Patent No.: US 10,419,926 B2
(45) Date of Patent: *Sep. 17, 2019

(54) SECURED MULTI-PAYLOAD ANTENNAS OPERATORS OPERATIONS

(71) Applicant: The Boeing Company, Chicago, IL (US)

(72) Inventors: Yi-Feng James Chen, Chicago, IL (US); Ryan R. Telkamp, Chicago, IL (US); Heidi E. Ziegler, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,863

(22) Filed: Nov. 13, 2018

(65) Prior Publication Data

US 2019/0082319 A1    Mar. 14, 2019

Related U.S. Application Data

(63) Continuation of application No. 15/451,183, filed on Mar. 6, 2017, now Pat. No. 10,165,438.

(51) Int. Cl.
*H04L 29/06* (2006.01)
*H04W 12/02* (2009.01)
(Continued)

(52) U.S. Cl.
CPC .......... *H04W 12/02* (2013.01); *H01Q 1/28* (2013.01); *H01Q 3/24* (2013.01); *H01Q 15/14* (2013.01);
(Continued)

(58) Field of Classification Search
None
See application file for complete search history.

(56) References Cited

U.S. PATENT DOCUMENTS 5,701,603 A * 12/1997 Norimatsu ............. H01Q 1/521
343/876
7,542,716 B2 * 6/2009 Bell ................... H04B 7/18515
455/3.02
(Continued)

FOREIGN PATENT DOCUMENTS

EP    1085680    3/2001
EP    1936833    6/2008
(Continued)

OTHER PUBLICATIONS

Halimi et al., "Applicability of Asymmetric Cryptography for Space Data Links Security Systems", 2016 IEEE Aerospace Conference, Mar. 5, 2016, pp. 1-13, IEEE.
(Continued)

*Primary Examiner* — Shin-Hon (Eric) Chen
(74) *Attorney, Agent, or Firm* — Haynes & Boone LLP

(57) ABSTRACT

A disclosed method for secured multi-payload antennas operators operations comprises generating, by an antenna operations center (AOC), AOC commands using an antenna location pointing request for each of at least one antenna associated with each of at least one customer. The method further comprises transmitting, by a satellite operation center (SOC), the AOC commands and SOC commands to a vehicle via a ground antenna, where the SOC commands are related to at least one antenna associated with a host. Also, the method comprises generating customer antenna gimballing commands by using the AOC commands, and generating host antenna gimballing commands by using the SOC commands. Further, the method comprises gimballing respectively each of the antenna(s) associated with each of the customer(s) by using the customer antenna gimballing commands, and gimballing respectively each of the antenna
(Continued)

Figure 1:
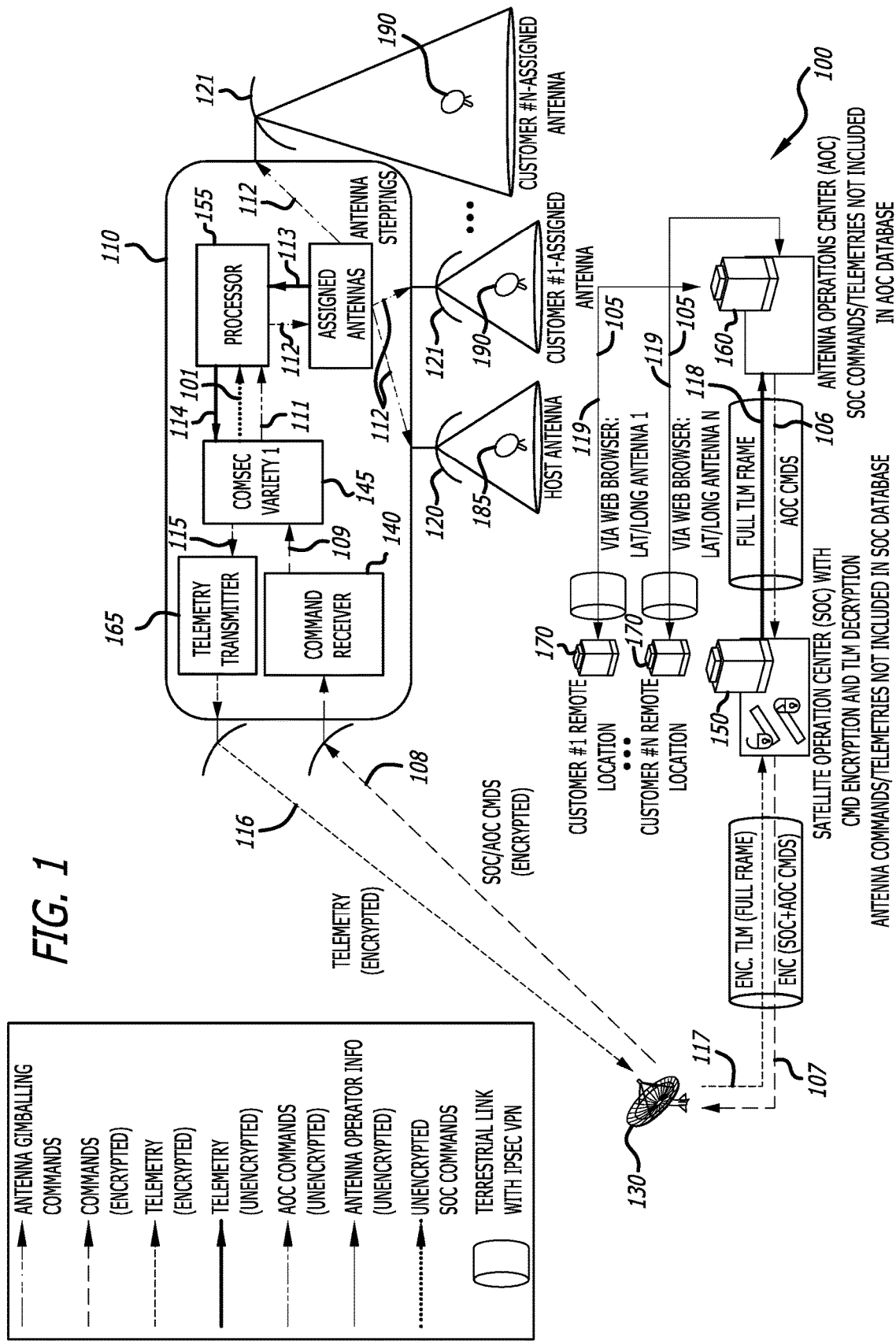
Figure 2A:
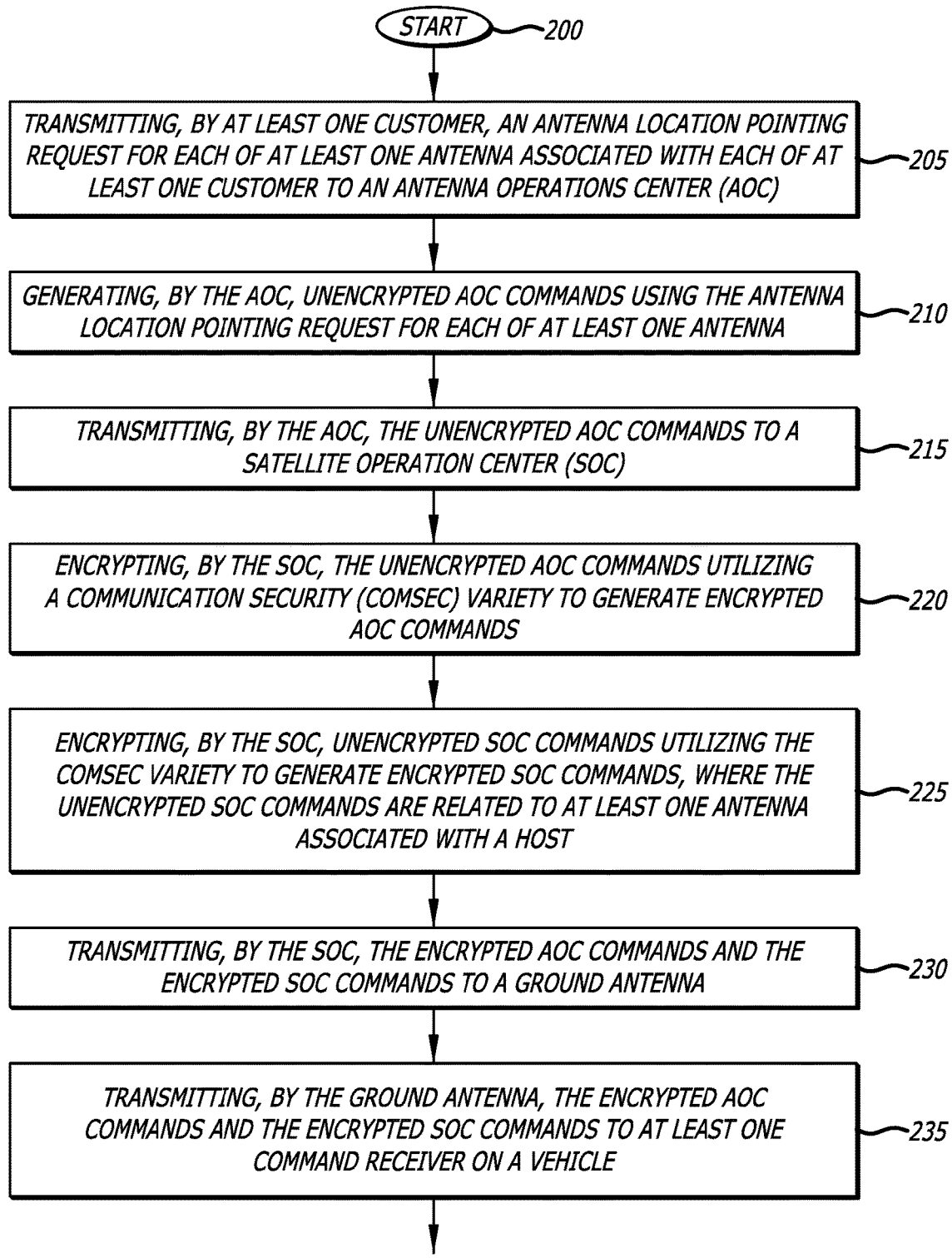
Figure 2B:
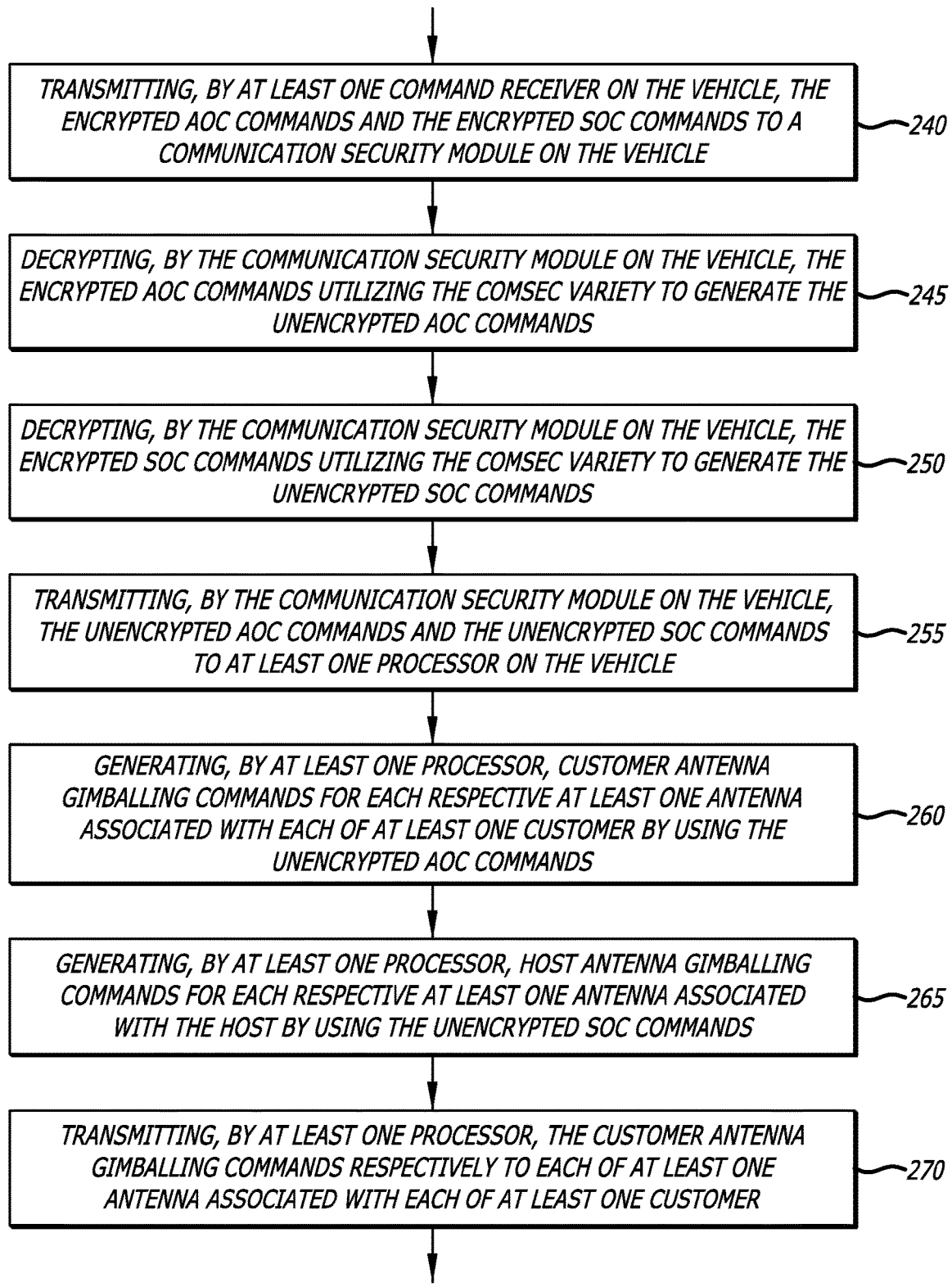
Figure 2C:
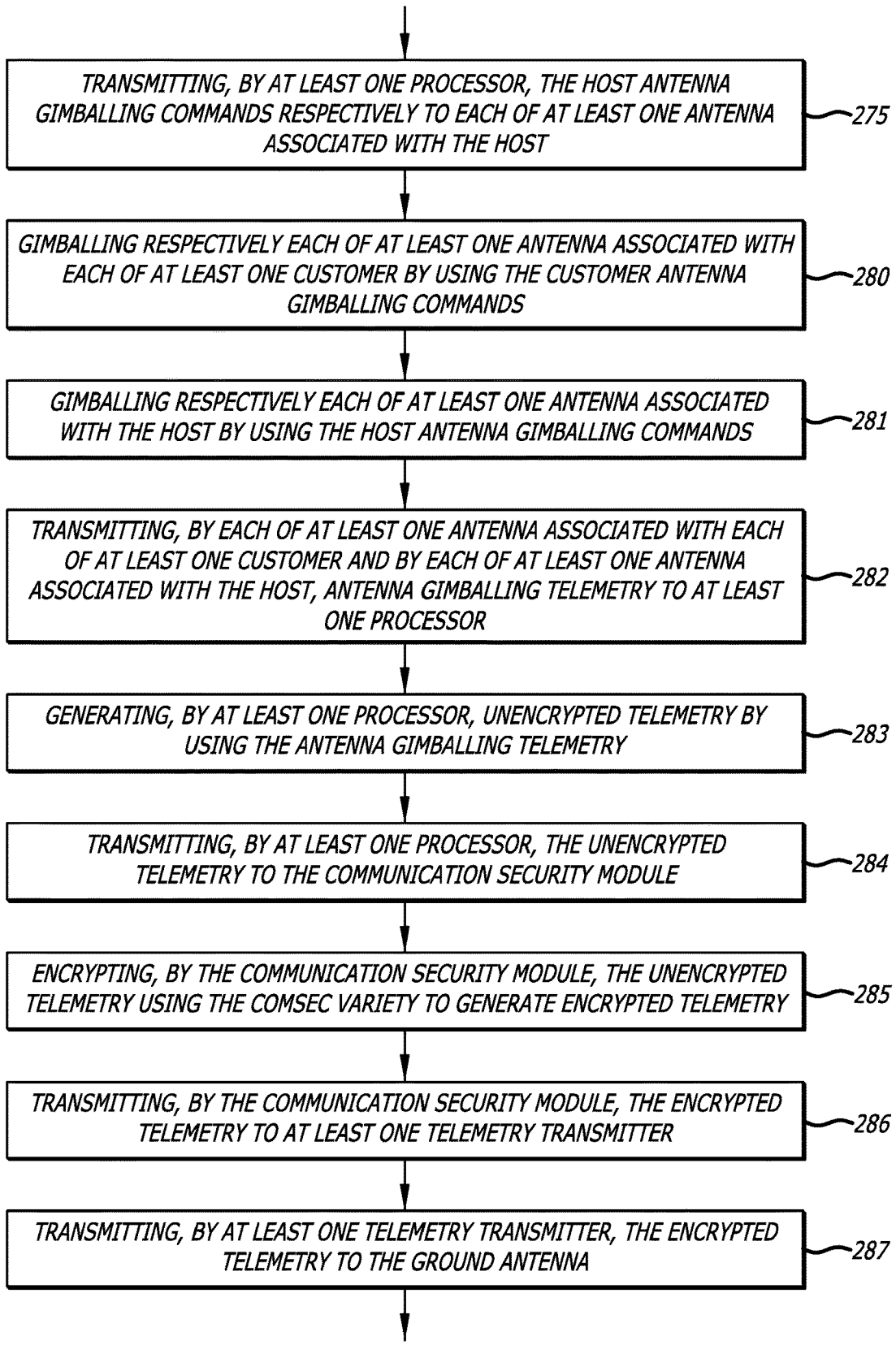
Figure 2D:
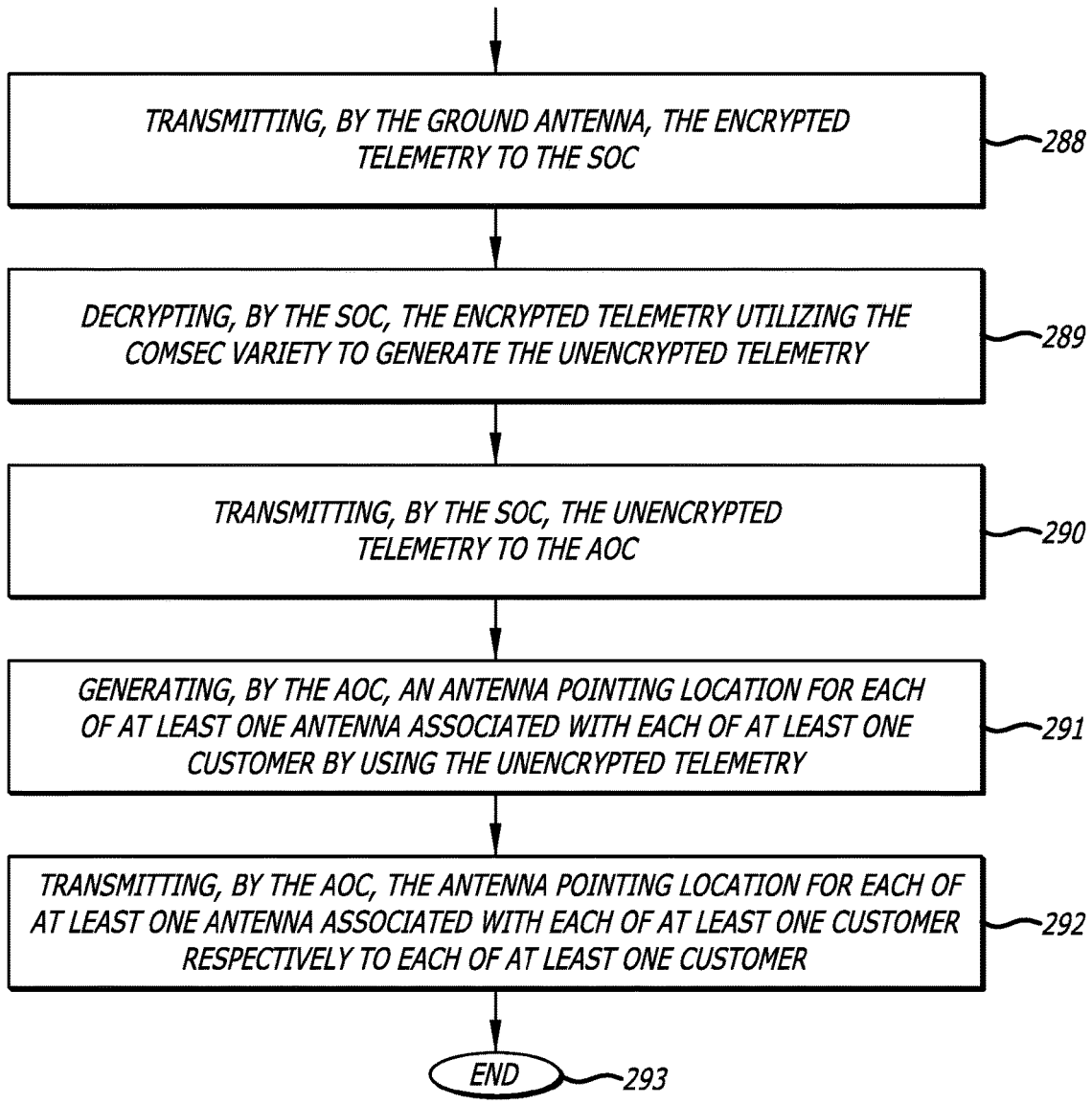

(s) associated with the host by using the host antenna gimballing commands.

20 Claims, 21 Drawing Sheets

(51) Int. Cl.
 *H04Q 9/00* (2006.01)
 *H01Q 15/14* (2006.01)
 *H01Q 3/24* (2006.01)
 *H01Q 1/28* (2006.01)
 *H04B 7/185* (2006.01)

(52) U.S. Cl.
 CPC ......... *H04B 7/185* (2013.01); *H04B 7/18565* (2013.01); *H04L 63/04* (2013.01); *H04L 63/0428* (2013.01); *H04Q 9/00* (2013.01); *H04L 63/0272* (2013.01); *H04L 2209/80* (2013.01); *H04L 2209/84* (2013.01)

(56) References Cited

U.S. PATENT DOCUMENTS

| | | | |
|---|---|---|---|
| 8,200,149 | B1 | 6/2012 | Chen |
| 8,521,427 | B1 | 8/2013 | Luyks |
| 8,614,945 | B2* | 12/2013 | Brunnenmeyer .. H04B 7/18584 370/230 |
| 8,873,456 | B2* | 10/2014 | Krikorian .......... H04B 7/18519 370/316 |
| 9,042,295 | B1 | 5/2015 | Baiter et al. |
| 9,337,918 | B2 | 5/2016 | Bell et al. |
| 2002/0104920 | A1 | 8/2002 | Thompson et al. |
| 2003/0017827 | A1 | 1/2003 | Ciaburro et al. |
| 2007/0133528 | A1 | 6/2007 | Jin et al. |
| 2008/0055151 | A1 | 3/2008 | Hudson et al. |
| 2008/0149776 | A1 | 6/2008 | Benedict |
| 2008/0153414 | A1 | 6/2008 | Ho et al. |
| 2009/0052369 | A1 | 2/2009 | Atkinson et al. |
| 2013/0046422 | A1* | 2/2013 | Cabos ................ G08G 5/0034 701/3 |
| 2013/0077788 | A1 | 3/2013 | Blanchard et al. |
| 2013/0137365 | A1 | 5/2013 | Taylor |
| 2014/0099986 | A1* | 4/2014 | Kikuchi ............ H04B 7/18506 455/518 |
| 2014/0119385 | A1 | 5/2014 | Hoffmeyer et al. |
| 2014/0303813 | A1 | 10/2014 | Ihns |
| 2015/0162955 | A1 | 6/2015 | Burch |
| 2015/0203213 | A1* | 7/2015 | Levien ................ G01C 21/00 701/486 |
| 2016/0087713 | A1 | 3/2016 | Oderman et al. |
| 2017/0012697 | A1 | 1/2017 | Gong et al. |
| 2017/0041065 | A1 | 2/2017 | Goettle, Jr. et al. |
| 2017/0134103 | A1 | 5/2017 | Tessandori et al. |
| 2018/0254822 | A1 | 9/2018 | Miller et al. |
| 2018/0254823 | A1 | 9/2018 | Miller et al. |
| 2018/0254866 | A1 | 9/2018 | Chen et al. |
| 2018/0255024 | A1 | 9/2018 | Chen et al. |
| 2018/0255025 | A1 | 9/2018 | Chen et al. |
| 2018/0255026 | A1 | 9/2018 | Winig et al. |
| 2018/0255027 | A1 | 9/2018 | Winig et al. |
| 2018/0255455 | A1 | 9/2018 | Winig et al. |

FOREIGN PATENT DOCUMENTS

| | | |
|---|---|---|
| EP | 2573956 | 3/2013 |
| JP | 2000166046 | 6/2000 |
| WO | WO 1996/032568 | 10/1996 |
| WO | WO 1999/040693 | 8/1999 |
| WO | WO 2013/130812 | 9/2013 |

OTHER PUBLICATIONS

Pang et al., "Chirp Program Lessons Learned From the Contractor Program Management Team Perspective", 2012 IEEE Aerospace Conference, Mar. 3, 2012, pp. 1-7, XP032230091, DOI: 10.1109/AERO.2012.6187278, ISBN: 978-1-4577-0556-4, IEEE.

* cited by examiner

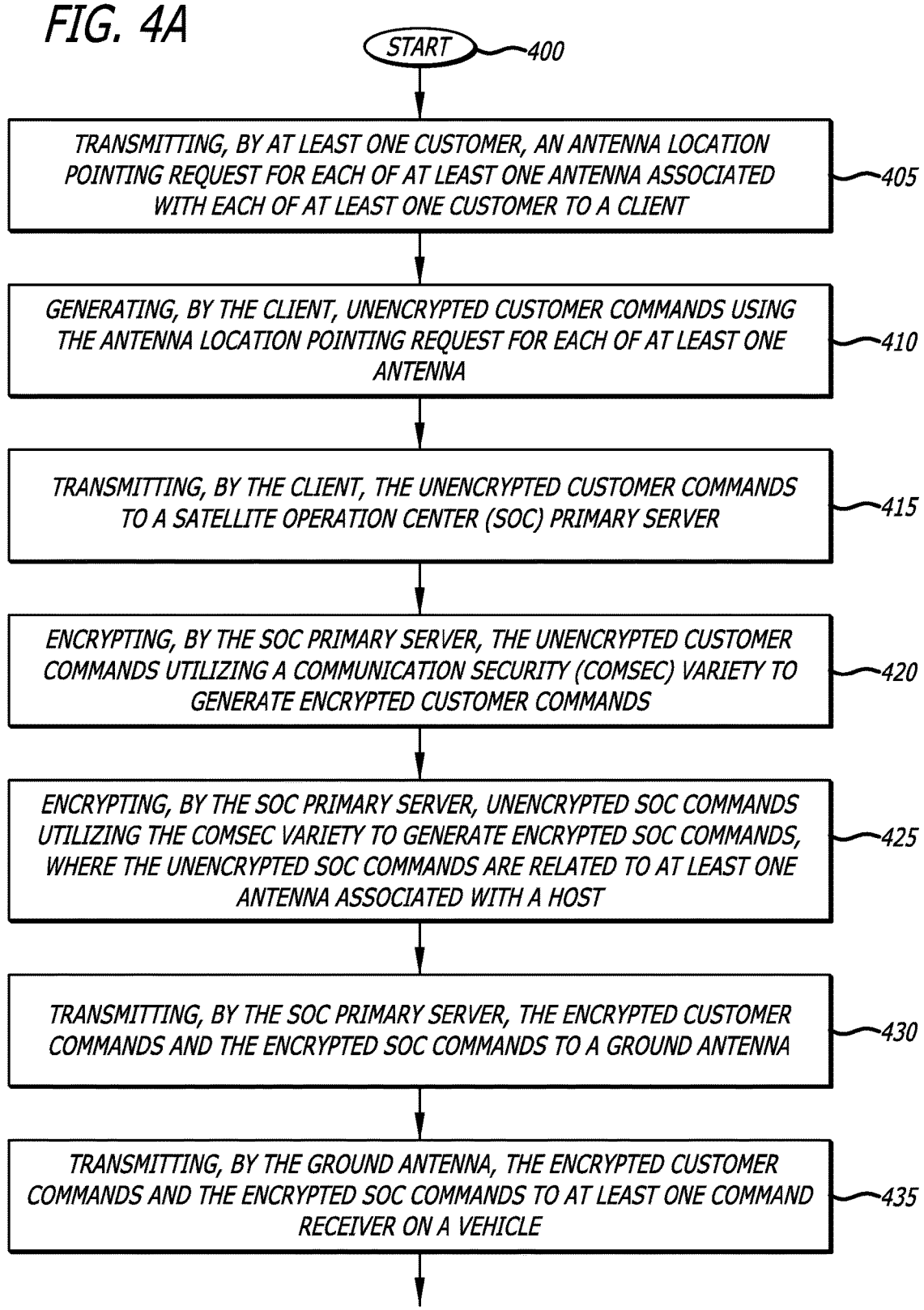

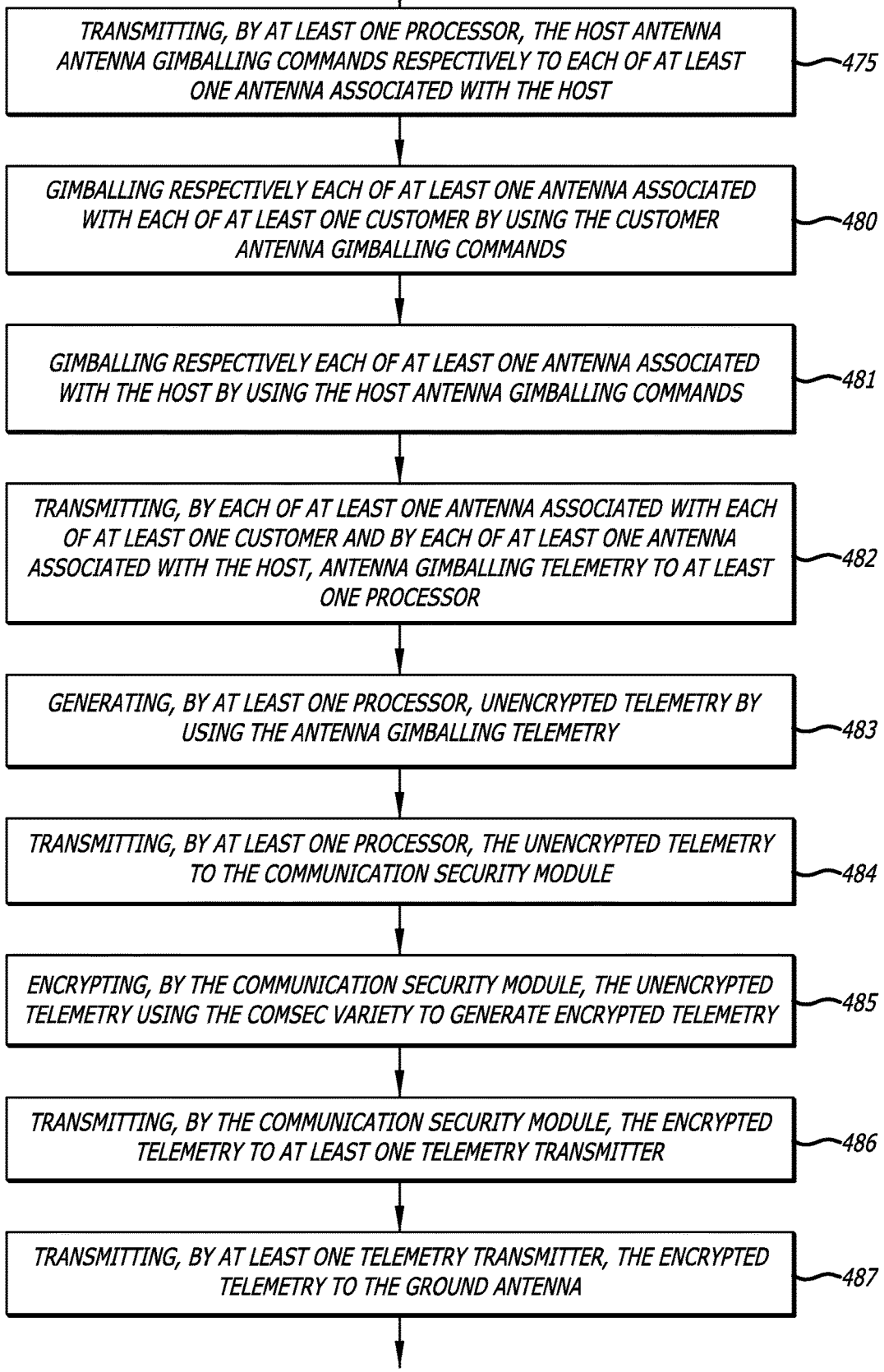

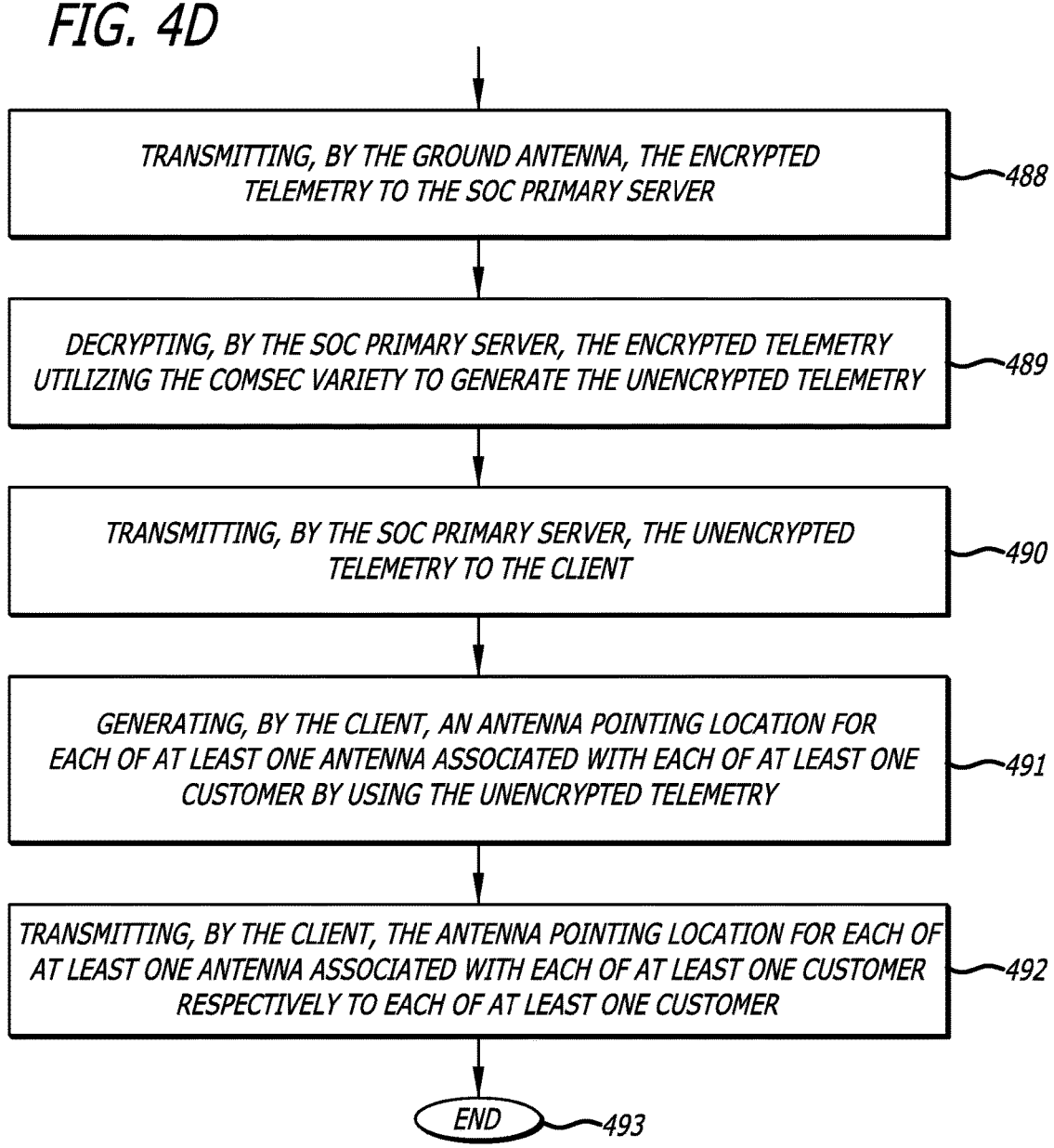

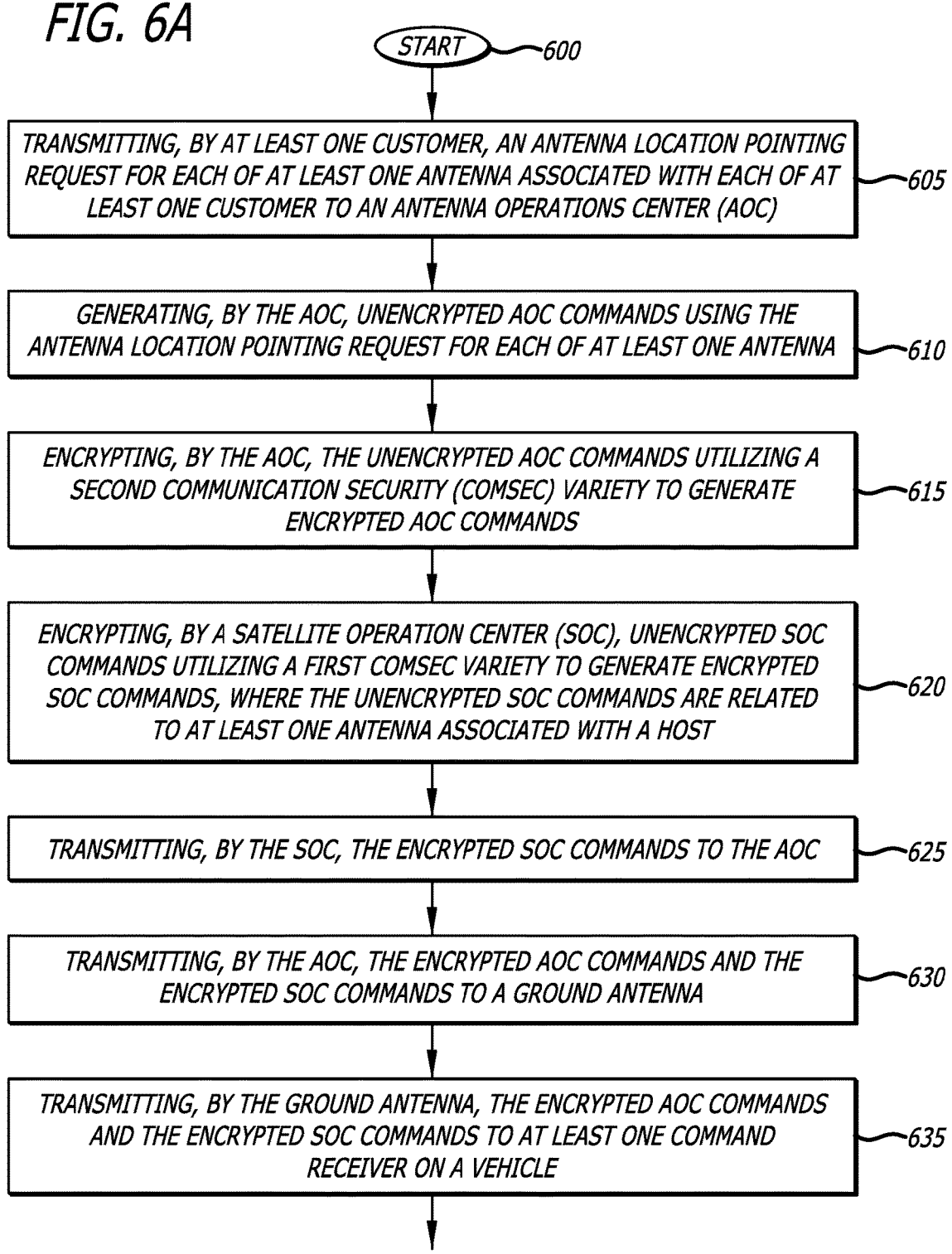

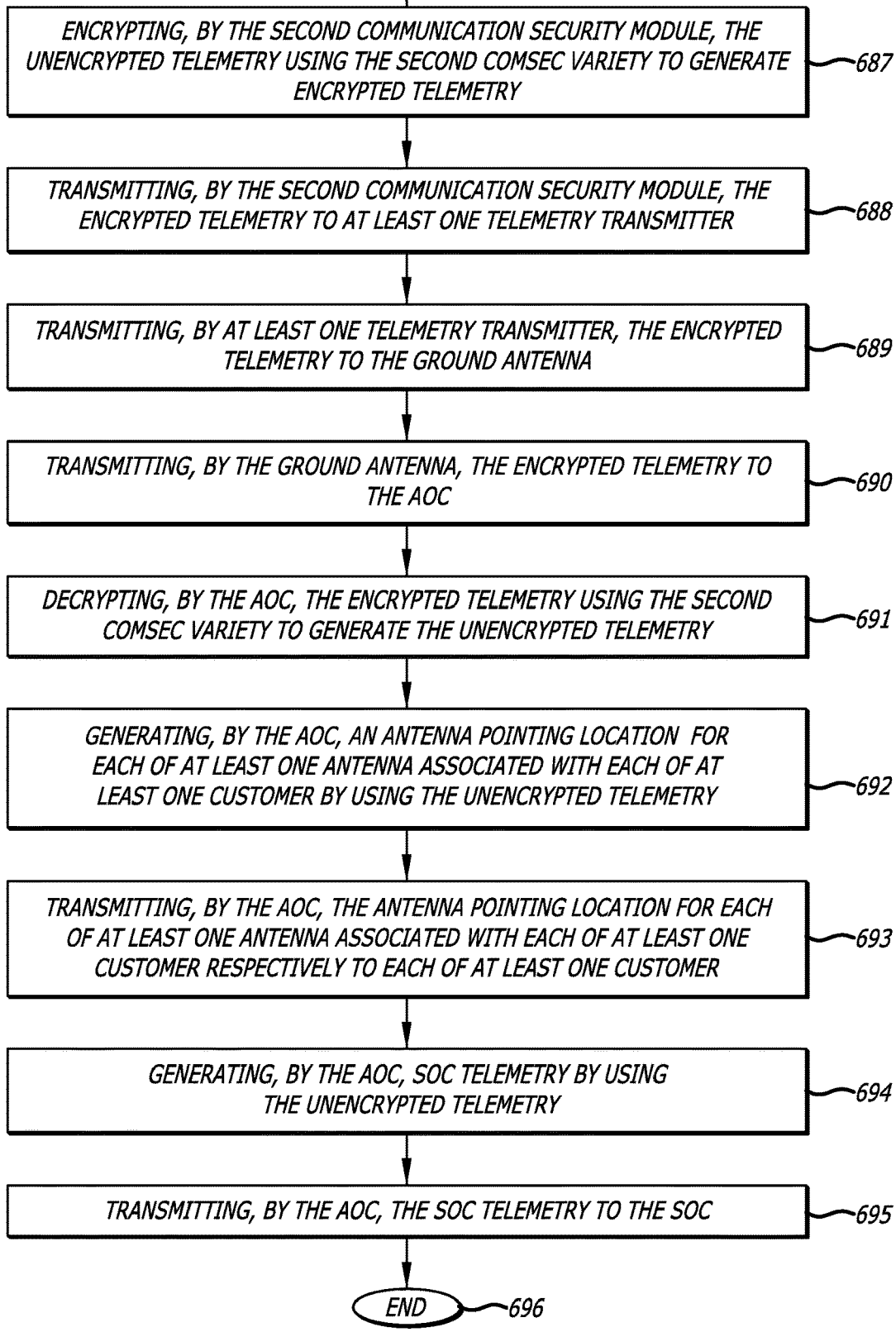

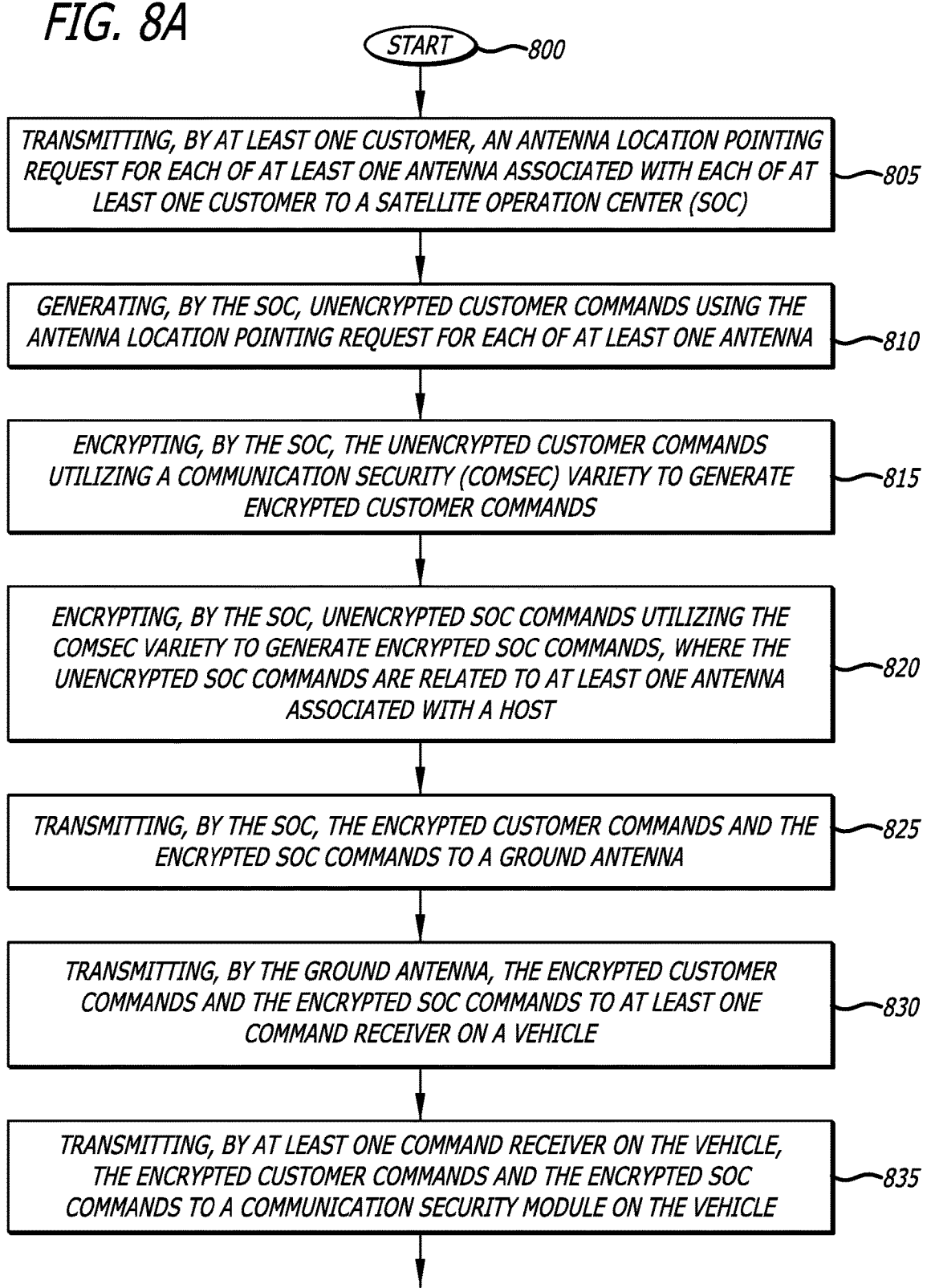

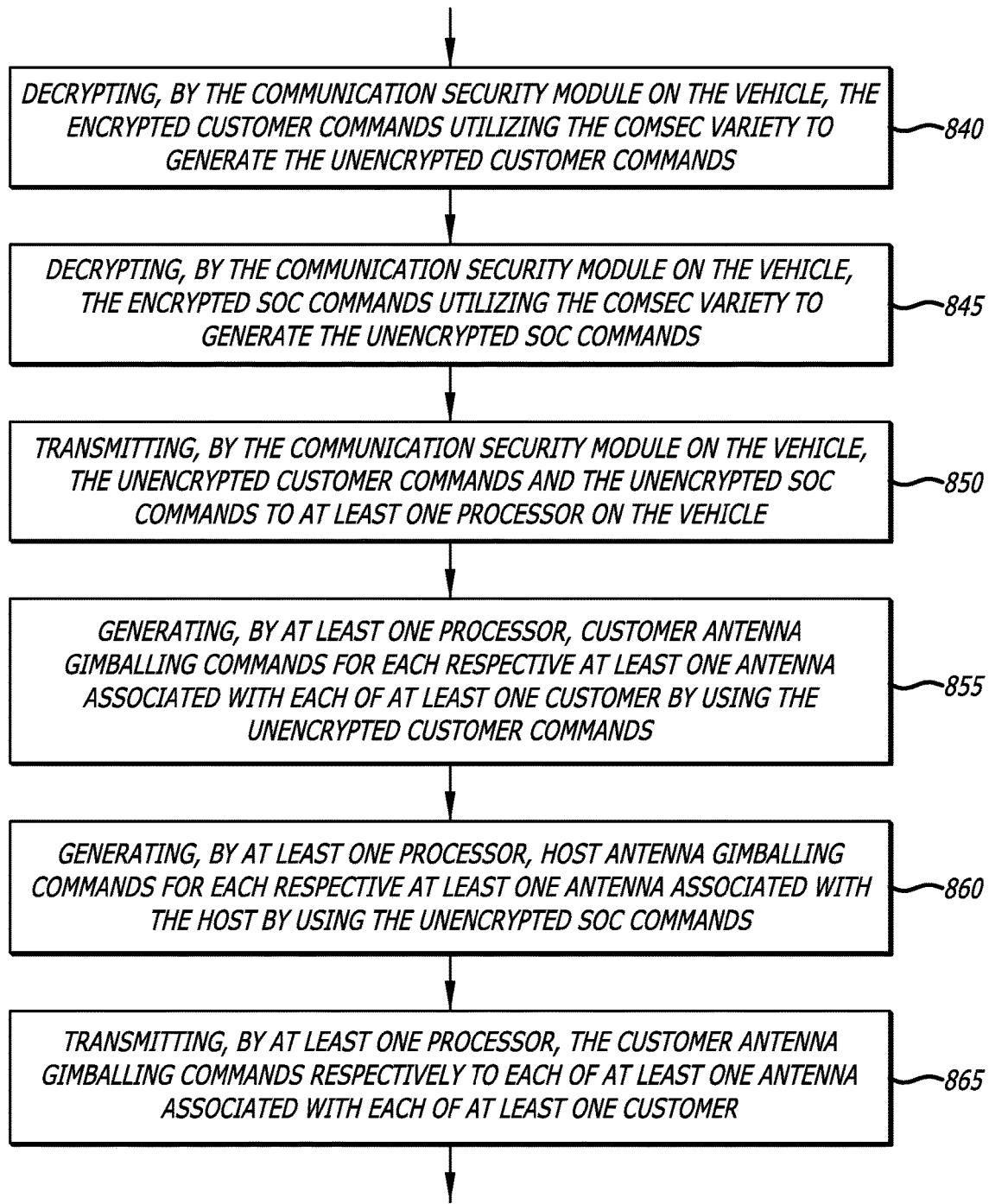

SECURED MULTI-PAYLOAD ANTENNAS OPERATORS OPERATIONS

CROSS-REFERENCE TO RELATED APPLICATION

This application claims priority to, and the benefit of, U.S. patent application Ser. No. 15/451,183, filed on Mar. 6, 2017, the entire disclosure of which is expressly incorporated by reference herein.

FIELD

The present disclosure relates to antennas operators operations. In particular, it relates to secured multi-payload antennas operators operations.

BACKGROUND

Currently, typical antennas (e.g., reflector antennas) on a vehicle (e.g., a satellite) have the ability to be steered (i.e. gimbaled) to change their pointing location (e.g., to change their antenna beam boresight). All of this antenna steering is commanded and controlled by a single satellite controller (e.g., a host) with no resource allocation privacy for customers utilizing antennas on the vehicle.

As such, there is a need for an improved antennas operators operations design that allows for privacy in the allocation of antenna resources.

SUMMARY

The present disclosure relates to a method, system, and apparatus for secured multi-payload antennas operators operations. In one or more embodiments, a method for secured multi-payload antennas operators operations comprises transmitting, by at least one customer, an antenna location pointing request for each of at least one antenna associated with each of at least one customer to an antenna operations center (AOC). The method further comprises generating, by the AOC, unencrypted AOC commands using the antenna location pointing request for each of at least one antenna. Also, the method comprises transmitting, by the AOC, the unencrypted AOC commands to a satellite operation center (SOC). In addition, the method comprises encrypting, by the SOC, the unencrypted AOC commands utilizing a communication security (COMSEC) variety to generate encrypted AOC commands. Additionally, the method comprises encrypting, by the SOC, unencrypted SOC commands utilizing the COMSEC variety to generate encrypted SOC commands. In one or more embodiments, the unencrypted SOC commands are related to at least one antenna associated with a host. Also, the method comprises transmitting, by the SOC, the encrypted AOC commands and the encrypted SOC commands to a ground antenna. In addition, the method comprises transmitting, by the ground antenna, the encrypted AOC commands and the encrypted SOC commands to a vehicle. Additionally, the method comprises decrypting, by a communication security module on the vehicle, the encrypted AOC commands utilizing the COMSEC variety to generate the unencrypted AOC commands. Also, the method comprises decrypting, by the communication security module on the vehicle, the encrypted SOC commands utilizing the COMSEC variety to generate the unencrypted SOC commands. In addition, the method comprises generating, by at least one processor, customer antenna gimballing commands for each respective at least one antenna associated with each of at least one customer by using the unencrypted AOC commands. Also, the method comprises generating, by at least one processor, host antenna gimballing commands for each respective at least one antenna associated with the host by using the unencrypted SOC commands. In addition, the method comprises gimballing respectively each of at least one antenna associated with each of at least one customer by using the customer antenna gimballing commands. Also, the method comprises gimballing respectively each of at least one antenna associated with the host by using the host antenna gimballing commands. In addition, the method comprises generating, by at least one processor, unencrypted telemetry by using antenna gimballing telemetry. Also, the method comprises encrypting, by the communication security module, the unencrypted telemetry using the COMSEC variety to generate encrypted telemetry. In addition, the method comprises transmitting, by the vehicle, the encrypted telemetry to the ground antenna. Additionally, the method comprises transmitting, by the ground antenna, the encrypted telemetry to the SOC. In addition, the method comprises decrypting, by the SOC, the encrypted telemetry utilizing the COMSEC variety to generate the unencrypted telemetry. Additionally, the method comprises transmitting, by the SOC, the unencrypted telemetry to the AOC. Also, the method comprises generating, by the AOC, an antenna pointing location for each of at least one antenna associated with each of at least one customer by using the unencrypted telemetry. Further, the method comprises transmitting, by the AOC, the antenna pointing location for each of at least one antenna associated with each of at least one customer respectively to each of at least one customer.

In one or more embodiments, at least one antenna associated with each of at least one customer comprises at least one antenna reflector. In some embodiments, at least one antenna associated with the host comprises at least one antenna reflector.

In at least one embodiment, the vehicle is a satellite, an aircraft, an unmanned aerial vehicle (UAV), or a space plane.

In one or more embodiments, the COMSEC variety comprises at least one encryption key and/or at least one algorithm.

In at least one embodiment, a method for secured multi-payload antennas operators operations comprises transmitting, by at least one customer, an antenna location pointing request for each of at least one antenna associated with each of at least one customer to a client. Also, the method comprises generating, by the client, unencrypted customer commands using the antenna location pointing request for each of at least one antenna. In addition, the method comprises transmitting, by the client, the unencrypted customer commands to a satellite operation center (SOC) primary server. Additionally, the method comprises encrypting, by the SOC primary server, the unencrypted customer commands utilizing a communication security (COMSEC) variety to generate encrypted customer commands. Also, the method comprises encrypting, by the SOC primary server, unencrypted SOC commands utilizing the COMSEC variety to generate encrypted SOC commands. In one or more embodiments, the unencrypted SOC commands are related to at least one antenna associated with a host. Also, the method comprises transmitting, by the SOC primary server, the encrypted customer commands and the encrypted SOC commands to a ground antenna. Additionally, the method comprises transmitting, by the ground antenna, the encrypted customer commands and the encrypted SOC commands to a vehicle. In addition, the method comprises decrypting, by a communication security module on the vehicle, the encrypted customer commands utilizing the COMSEC variety to generate the unencrypted customer commands. Also, the method comprises decrypting, by the communication security module on the vehicle, the encrypted SOC commands utilizing the COMSEC variety to generate the unencrypted SOC commands. Also, the method comprises generating, by at least one processor, customer antenna gimballing commands for each respective at least one antenna associated with each of at least one customer by using the unencrypted customer commands. In addition, the method comprises generating, by at least one processor, host antenna gimballing commands for each respective at least one antenna associated with the host by using the unencrypted SOC commands. Also, the method comprises gimballing respectively each of at least one antenna associated with each of at least one customer by using the customer antenna gimballing commands. In addition, the method comprises gimballing respectively each of at least one antenna associated with the host by using the host antenna gimballing commands. Additionally, the method comprises generating, by at least one processor, unencrypted telemetry by using antenna gimballing telemetry. Also, the method comprises encrypting, by the communication security module, the unencrypted telemetry using the COMSEC variety to generate encrypted telemetry. In addition, the method comprises transmitting, by the vehicle, the encrypted telemetry to the ground antenna. Also, the method comprises transmitting, by the ground antenna, the encrypted telemetry to the SOC primary server. In addition, the method comprises decrypting, by the SOC primary server, the encrypted telemetry utilizing the COMSEC variety to generate the unencrypted telemetry. Also, the method comprises transmitting, by the SOC primary server, the unencrypted telemetry to the client. In addition, the method comprises generating, by the client, an antenna pointing location for each of at least one antenna associated with each of at least one customer by using the unencrypted telemetry. Further, the method comprises transmitting, by the client, the antenna pointing location for each of at least one antenna associated with each of at least one customer respectively to each of at least one customer.

In one or more embodiments, a method for secured multi-payload antennas operators operations comprises transmitting, by at least one customer, an antenna location pointing request for each of at least one antenna associated with each of at least one customer to an antenna operations center (AOC). Also, the method comprises generating, by the AOC, unencrypted AOC commands using the antenna location pointing request for each of at least one antenna. In addition, the method comprises encrypting, by the AOC, the unencrypted AOC commands utilizing a second communication security (COMSEC) variety to generate encrypted AOC commands. Additionally, the method comprises encrypting, by a satellite operation center (SOC), unencrypted SOC commands utilizing a first COMSEC variety to generate encrypted SOC commands. In one or more embodiments, the unencrypted SOC commands are related to at least one antenna associated with a host. Also, the method comprises transmitting, by the SOC, the encrypted SOC commands to the AOC. In addition, the method comprises transmitting, by the AOC, the encrypted AOC commands and the encrypted SOC commands to a ground antenna. Additionally, the method comprises transmitting, by the ground antenna, the encrypted AOC commands and the encrypted SOC commands to a vehicle. Also, the method comprises decrypting, by a first communication security module on the vehicle, the encrypted SOC commands utilizing the first COMSEC variety to generate the unencrypted SOC commands. In addition, the method comprises decrypting, by a second communication security module on the vehicle, the encrypted AOC commands utilizing the second COMSEC variety to generate the unencrypted AOC commands. Additionally, the method comprises generating, by at least one processor, customer antenna gimballing commands for each respective at least one antenna associated with each of at least one customer by using the unencrypted AOC commands. In addition, the method comprises generating, by at least one processor, host antenna gimballing commands for each respective at least one antenna associated with the host by using the unencrypted SOC commands. Also, the method comprises gimballing respectively each of at least one antenna associated with each of at least one customer by using the customer antenna gimballing commands. In addition, the method comprises gimballing respectively each of at least one antenna associated with the host by using the host antenna gimballing commands. Also, the method comprises generating, by at least one processor, unencrypted telemetry by using the antenna gimballing telemetry. In addition, the method comprises encrypting, by the second communication security module, the unencrypted telemetry using the second COMSEC variety to generate encrypted telemetry. Additionally, the method comprises transmitting, by the vehicle, the encrypted telemetry to the ground antenna. Also, the method comprises transmitting, by the ground antenna, the encrypted telemetry to the AOC. In addition, the method comprises decrypting, by the AOC, the encrypted telemetry using the second COMSEC variety to generate the unencrypted telemetry. Also, the method comprises generating, by the AOC, an antenna pointing location for each of at least one antenna associated with each of at least one customer by using the unencrypted telemetry. In addition, the method comprises transmitting, by the AOC, the antenna pointing location for each of at least one antenna associated with each of at least one customer respectively to each of at least one customer. In addition, the method comprises generating, by the AOC, SOC telemetry by using the unencrypted telemetry. Further, the method comprises transmitting, by the AOC, the SOC telemetry to the SOC.

In at least one embodiment, the first COMSEC variety comprises at least one encryption key and/or at least one algorithm. In some embodiments, the second COMSEC variety comprises at least one encryption key and/or at least one algorithm.

In one or more embodiments, a method for secured multi-payload antennas operators operations comprises transmitting, by at least one customer, an antenna location pointing request for each of at least one antenna associated with each of at least one customer to a satellite operation center (SOC). The method further comprises generating, by the SOC, unencrypted customer commands using the antenna location pointing request for each of at least one antenna. Also, the method comprises encrypting, by the SOC, the unencrypted customer commands utilizing a communication security (COMSEC) variety to generate encrypted customer commands. In addition, the method comprises encrypting, by the SOC, unencrypted SOC commands utilizing the COMSEC variety to generate encrypted SOC commands. In one or more embodiments, the unencrypted SOC commands are related to at least one antenna associated with a host. Also, the method comprises transmitting, by the SOC, the encrypted customer commands and the encrypted SOC commands to a ground antenna. In addition, the method comprises transmitting, by the ground antenna, the encrypted customer commands and the encrypted SOC commands to a vehicle. Additionally, the method comprises decrypting, by a communication security module on the vehicle, the encrypted customer commands utilizing the COMSEC variety to generate the unencrypted customer commands. Also, the method comprises decrypting, by the communication security module on the vehicle, the encrypted SOC commands utilizing the COMSEC variety to generate the unencrypted SOC commands. In addition, the method comprises generating, by at least one processor, customer antenna gimballing commands for each respective at least one antenna associated with each of at least one customer by using the unencrypted customer commands. Also, the method comprises generating, by at least one processor, host antenna gimballing commands for each respective at least one antenna associated with the host by using the unencrypted SOC commands. Also, the method comprises gimballing respectively each of at least one antenna associated with each of at least one customer by using the customer antenna gimballing commands. In addition, the method comprises gimballing respectively each of at least one antenna associated with the host by using the host antenna gimballing commands. Also, the method comprises generating, by at least one processor, unencrypted telemetry by using the antenna gimballing telemetry. In addition, the method comprises encrypting, by the communication security module, the unencrypted telemetry using the COMSEC variety to generate encrypted telemetry. Also, the method comprises transmitting, by the vehicle, the encrypted telemetry to the ground antenna. Additionally, the method comprises transmitting, by the ground antenna, the encrypted telemetry to the SOC. Also, the method comprises decrypting, by the SOC, the encrypted telemetry by using the COMSEC variety to generate the unencrypted telemetry. Also, the method comprises generating, by the SOC, an antenna pointing location for each of at least one antenna associated with each of at least one customer by using the unencrypted telemetry. Further, the method comprises transmitting, by the SOC, the antenna pointing location for each of at least one antenna associated with each of at least one customer respectively to each of at least one customer.

In one or more embodiments, a system for secured multi-payload antennas operators operations comprises an antenna operations center (AOC) to generate unencrypted AOC commands using an antenna location pointing request for each of at least one antenna associated with each of at least one customer, and to transmit the unencrypted AOC commands to a satellite operation center (SOC). The system further comprises the SOC to encrypt the unencrypted AOC commands utilizing a communication security (COMSEC) variety to generate encrypted AOC commands; to encrypt unencrypted SOC commands utilizing the COMSEC variety to generate encrypted SOC commands, where the unencrypted SOC commands are related to at least one antenna associated with a host; and to transmit the encrypted AOC commands and the encrypted SOC commands to a ground antenna. Also, the system comprises the ground antenna to transmit the encrypted AOC commands and the encrypted SOC commands to a vehicle. In addition, the system comprises a communication security module on the vehicle to decrypt the encrypted AOC commands utilizing the COMSEC variety to generate the unencrypted AOC commands, and to decrypt the encrypted SOC commands utilizing the COMSEC variety to generate the unencrypted SOC commands. Additionally, the system comprises at least one processor to generate customer antenna gimballing commands for each respective at least one antenna associated with each of at least one customer by using the unencrypted AOC commands, and to generate host antenna gimballing commands for each respective at least one antenna associated with the host by using the unencrypted SOC commands. Also, the system comprises each of at least one antenna associated with each of at least one customer gimballed by using the customer antenna gimballing commands. In addition, the system comprises each of at least one antenna associated with the host gimballed by using the host antenna gimballing commands. Also, the system comprises at least one processor to generate unencrypted telemetry by using antenna gimballing telemetry. In addition, the system comprises the communication security module to encrypt the unencrypted telemetry using the COMSEC variety to generate encrypted telemetry. Also, the system comprises the vehicle to transmit the encrypted telemetry to the ground antenna. In addition, the system comprises the ground antenna to transmit the encrypted telemetry to the SOC. Additionally, the system comprises the SOC to decrypt the encrypted telemetry utilizing the COMSEC variety to generate the unencrypted telemetry, and to transmit the unencrypted telemetry to the AOC. Further, the system comprises the AOC to generate an antenna pointing location for each of at least one antenna associated with each of at least one customer by using the unencrypted telemetry, and to transmit the antenna pointing location for each of at least one antenna associated with each of at least one customer respectively to each of at least one customer.

In at least one embodiment, a system for secured multi-payload antennas operators operations comprises a client to generate unencrypted customer commands using an antenna location pointing request for each of at least one antenna associated with each of at least one customer, and to transmit the unencrypted customer commands to a satellite operation center (SOC) primary server. The system further comprises the SOC primary server to encrypt the unencrypted customer commands utilizing a communication security (COMSEC) variety to generate encrypted customer commands; to encrypt unencrypted SOC commands utilizing the COMSEC variety to generate encrypted SOC commands, where the unencrypted SOC commands are related to at least one antenna associated with a host; and to transmit the encrypted customer commands and the encrypted SOC commands to a ground antenna. Also, the system comprises the ground antenna to transmit the encrypted customer commands and the encrypted SOC commands to a vehicle. In addition, the system comprises a communication security module on the vehicle to decrypt the encrypted customer commands utilizing the COMSEC variety to generate the unencrypted customer commands, and to decrypt the encrypted SOC commands utilizing the COMSEC variety to generate the unencrypted SOC commands. Also, the system comprises at least one processor to generate customer antenna gimballing commands for each respective at least one antenna associated with each of at least one customer by using the unencrypted customer commands, to generate host antenna gimballing commands for each respective at least one antenna associated with the host by using the unencrypted SOC commands. In addition, the system comprises each of at least one antenna associated with each of at least one customer gimbaled by using the customer antenna gimballing commands. Also, the system comprises each of at least one antenna associated with the host gimbaled by using the host antenna gimballing commands. In addition, the system comprises at least one processor to generate unencrypted telemetry by using antenna gimballing telemetry.

Additionally, the system comprises the communication security module to encrypt the unencrypted telemetry using the COMSEC variety to generate encrypted telemetry. Also, the system comprises the vehicle to transmit the encrypted telemetry to the ground antenna. In addition, the system comprises the ground antenna to transmit the encrypted telemetry to the SOC primary server. Additionally, the system comprises the SOC primary server to decrypt the encrypted telemetry utilizing the COMSEC variety to generate the unencrypted telemetry, and to transmit the unencrypted telemetry to the client. Further, the system comprises the client to generate an antenna pointing location for each of at least one antenna associated with each of at least one customer by using the unencrypted telemetry, and to transmit the antenna pointing location for each of at least one antenna associated with each of at least one customer respectively to each of at least one customer.

In one or more embodiments, a system for secured multi-payload antennas operators operations comprises an antenna operations center (AOC) to generate unencrypted AOC commands using an antenna location pointing request for each of at least one antenna associated with each of at least one customer, and to encrypt the unencrypted AOC commands utilizing a second communication security (COMSEC) variety to generate encrypted AOC commands. The system further comprises a satellite operation center (SOC) to encrypt unencrypted SOC commands utilizing a first COMSEC variety to generate encrypted SOC commands, where the unencrypted SOC commands are related to at least one antenna associated with a host, and to transmit the encrypted SOC commands to the AOC. Also, the system comprises the AOC to transmit the encrypted AOC commands and the encrypted SOC commands to a ground antenna. In addition, the system comprises the ground antenna to transmit the encrypted AOC commands and the encrypted SOC commands to a vehicle. Additionally, the system comprises a first communication security module on the vehicle to decrypt the encrypted SOC commands utilizing the first COMSEC variety to generate the unencrypted SOC commands. Also, the system comprises a second communication security module on the vehicle to decrypt the encrypted AOC commands utilizing the second COMSEC variety to generate the unencrypted AOC commands. In addition, the system comprises at least one processor to generate customer antenna gimballing commands for each respective at least one antenna associated with each of at least one customer by using the unencrypted AOC commands, and to generate host antenna gimballing commands for each respective at least one antenna associated with the host by using the unencrypted SOC commands. Additionally, the system comprises each of at least one antenna associated with each of at least one customer gimbaled by using the customer antenna gimballing commands. Also, the system comprises each of at least one antenna associated with the host gimbaled by using the host antenna gimballing commands. In addition, the system comprises at least one processor to generate unencrypted telemetry by using the antenna gimballing telemetry. Additionally, the system comprises the second communication security module to encrypt the unencrypted telemetry using the second COMSEC variety to generate encrypted telemetry. Also, the system comprises the vehicle to transmit the encrypted telemetry to the ground antenna. In addition, the system comprises the ground antenna to transmit the encrypted telemetry to the AOC. Further, the system comprises the AOC to decrypt the encrypted telemetry using the second COMSEC variety to generate the unencrypted telemetry, to generate an antenna pointing location for each of at least one antenna associated with each of at least one customer by using the unencrypted telemetry, to transmit the antenna pointing location for each of at least one antenna associated with each of at least one customer respectively to each of at least one customer, to generate SOC telemetry by using the unencrypted telemetry, and to transmit the SOC telemetry to the SOC.

In at least one embodiment, a system for secured multi-payload antennas operators operations comprises transmitting, by at least one customer, an antenna location pointing request for each of at least one antenna associated with each of at least one customer to a satellite operation center (SOC). The system further comprises the SOC to generate unencrypted customer commands using an antenna location pointing request for each of at least one antenna associated with each of at least one customer; to encrypt the unencrypted customer commands utilizing a communication security (COMSEC) variety to generate encrypted customer commands; to encrypt unencrypted SOC commands utilizing the COMSEC variety to generate encrypted SOC commands, where the unencrypted SOC commands are related to at least one antenna associated with a host; and to transmit the encrypted customer commands and the encrypted SOC commands to a ground antenna. In addition, the system comprises the ground antenna to transmit the encrypted customer commands and the encrypted SOC commands to a vehicle. Also, the system comprises a communication security module on the vehicle to decrypt the encrypted customer commands utilizing the COMSEC variety to generate the unencrypted customer commands, and to decrypt the encrypted SOC commands utilizing the COMSEC variety to generate the unencrypted SOC commands. In addition, the system comprises at least one processor to generate customer antenna gimballing commands for each respective at least one antenna associated with each of at least one customer by using the unencrypted customer commands, and to generate host antenna gimballing commands for each respective at least one antenna associated with the host by using the unencrypted SOC commands. Also, the system comprises each of at least one antenna associated with each of at least one customer gimbaled by using the customer antenna gimballing commands. In addition, the system comprises each of at least one antenna associated with the host gimbaled by using the host antenna gimballing commands. Additionally, the system comprises at least one processor to generate unencrypted telemetry by using the antenna gimballing telemetry. Also, the system comprises the communication security module to encrypt the unencrypted telemetry using the COMSEC variety to generate encrypted telemetry. In addition, the system comprises the vehicle to transmit the encrypted telemetry to the ground antenna. Additionally, the system comprises the ground antenna to transmit the encrypted telemetry to the SOC. Further, the system comprises the SOC to decrypt the encrypted telemetry by using the COMSEC variety to generate the unencrypted telemetry, to generate an antenna pointing location for each of at least one antenna associated with each of at least one customer by using the unencrypted telemetry, and to transmit the antenna pointing location for each of at least one antenna associated with each of at least one customer respectively to each of at least one customer.

In one or more embodiments, a method for secured multi-payload antennas operators operations comprises generating, by an antenna operations center (AOC), AOC commands using an antenna location pointing request for each of at least one antenna associated with each of at least one customer. The method further comprises transmitting, by a satellite operation center (SOC), the AOC commands and SOC commands to a vehicle via a ground antenna. In one or more embodiments, the SOC commands are related to at least one antenna associated with a host. Also, the method comprises generating, on the vehicle, customer antenna gimballing commands by using the AOC commands. In addition, the method comprises generating, on the vehicle, host antenna gimballing commands by using the SOC commands. Additionally, the method comprises gimballing respectively each of at least one antenna associated with each of at least one customer by using the customer antenna gimballing commands. Further, the method comprises gimballing respectively each of at least one antenna associated with the host by using the host antenna gimballing commands.

In one or more embodiments, a system for secured multi-payload antennas operators operations comprising an antenna operations center (AOC) to generate AOC commands using an antenna location pointing request for each of at least one antenna associated with each of at least one customer. The system further comprises a satellite operation center (SOC) to transmit the AOC commands and SOC commands to a vehicle via a ground antenna. In one or more embodiments, the SOC commands are related to at least one antenna associated with a host. The further system comprises the vehicle to generate customer antenna gimballing commands by using the AOC commands and to generate host antenna gimballing commands by using the SOC commands. Also, the system comprises each of at least one antenna associated with each of at least one customer gimballed respectively by using the customer antenna gimballing commands. Further, the system comprises each of at least one antenna associated with the host gimballed respectively by using the host antenna gimballing commands.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 1 is a diagram showing the disclosed system for secured multi-payload antennas operators operations utilizing an antenna operations center (AOC), a satellite operation center (SOC) uplink, and a single communication security (COMSEC) variety for encryption, in accordance with at least one embodiment of the present disclosure.

FIGS. 2A, 2B, 2C, and 2D together show a flow chart for the disclosed method for secured multi-payload antennas operators operations utilizing an AOC, a SOC uplink, and a single COMSEC variety for encryption, in accordance with at least one embodiment of the present disclosure.

Figure 3:
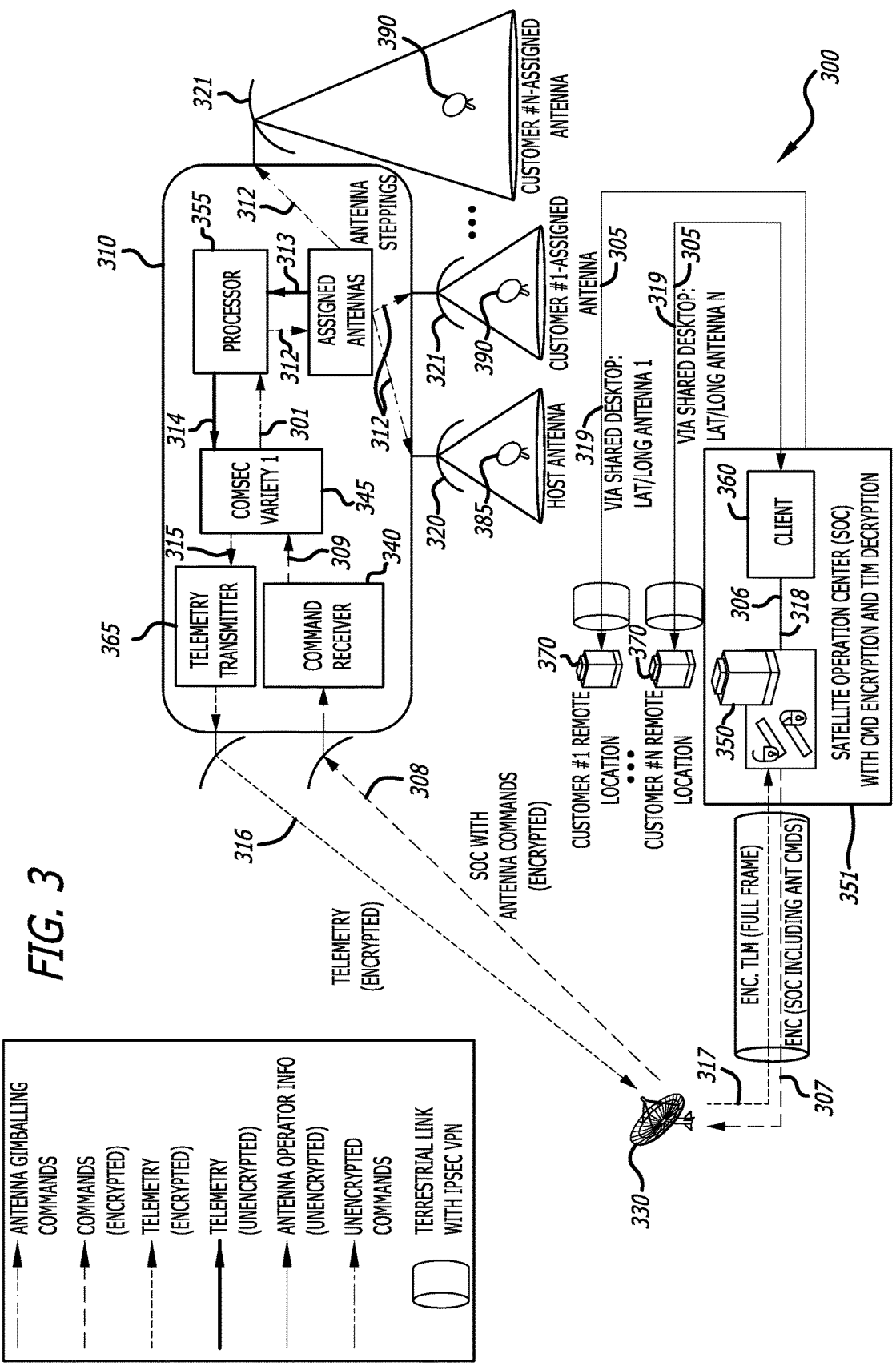
Figure 4B:
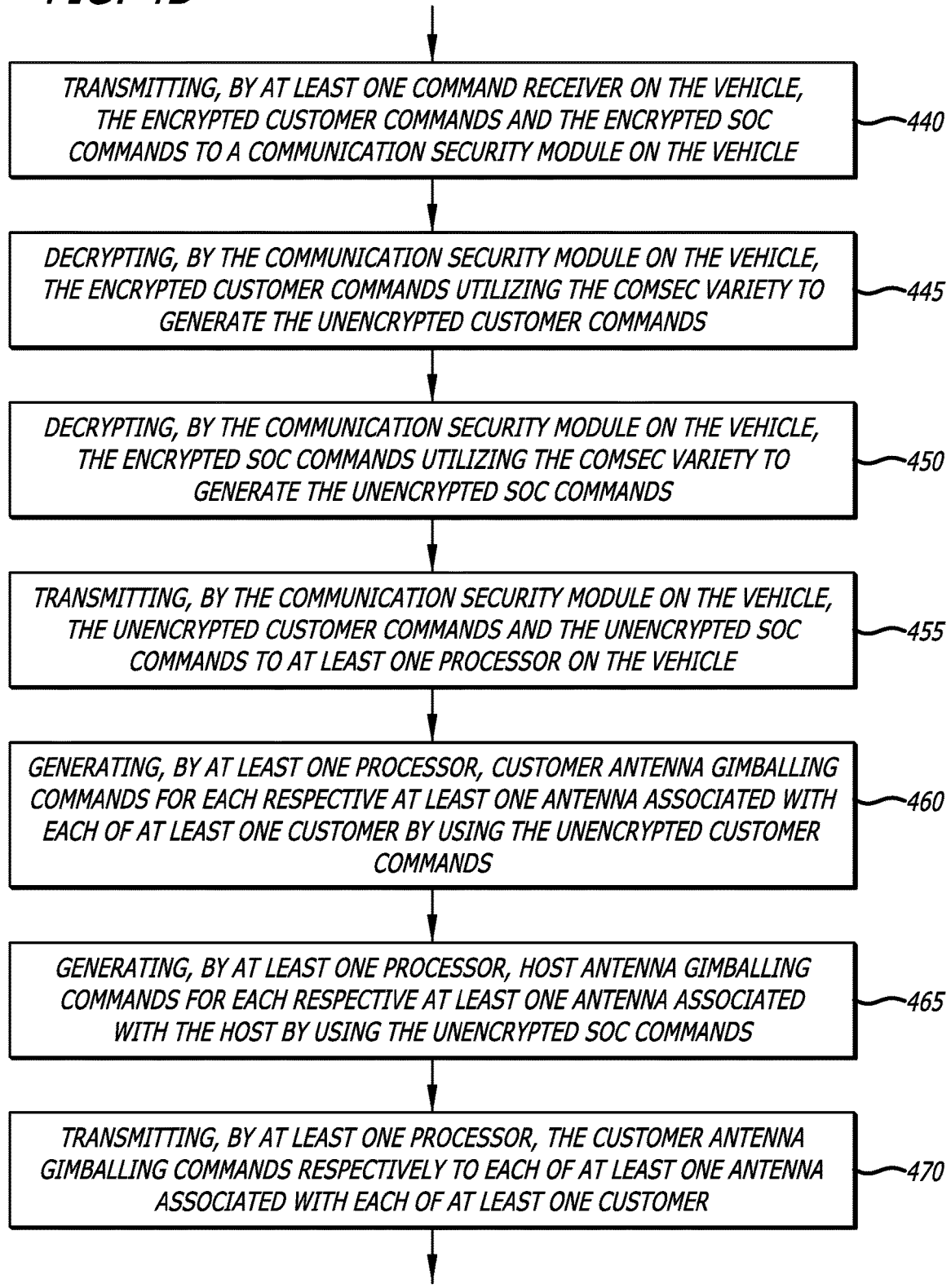

FIG. 3 is a diagram showing the disclosed system for secured multi-payload antennas operators operations utilizing a client, a SOC uplink, and a single COMSEC variety for encryption, in accordance with at least one embodiment of the present disclosure.

FIGS. 4A, 4B, 4C, and 4D together show a flow chart for the disclosed method for secured multi-payload antennas operators operations utilizing a client, a SOC uplink, and a single COMSEC variety for encryption, in accordance with at least one embodiment of the present disclosure.

Figure 5:
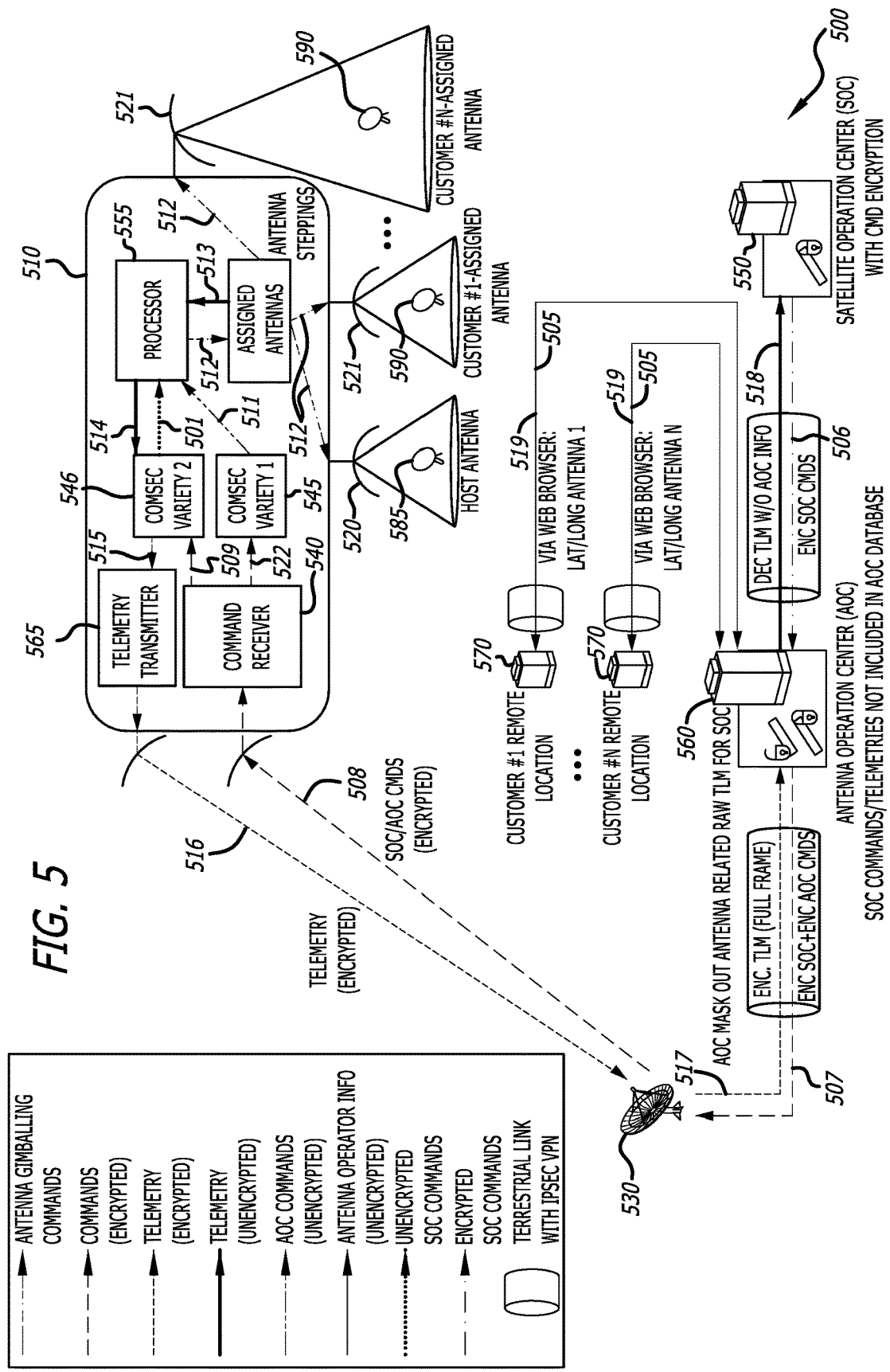
Figure 6B:
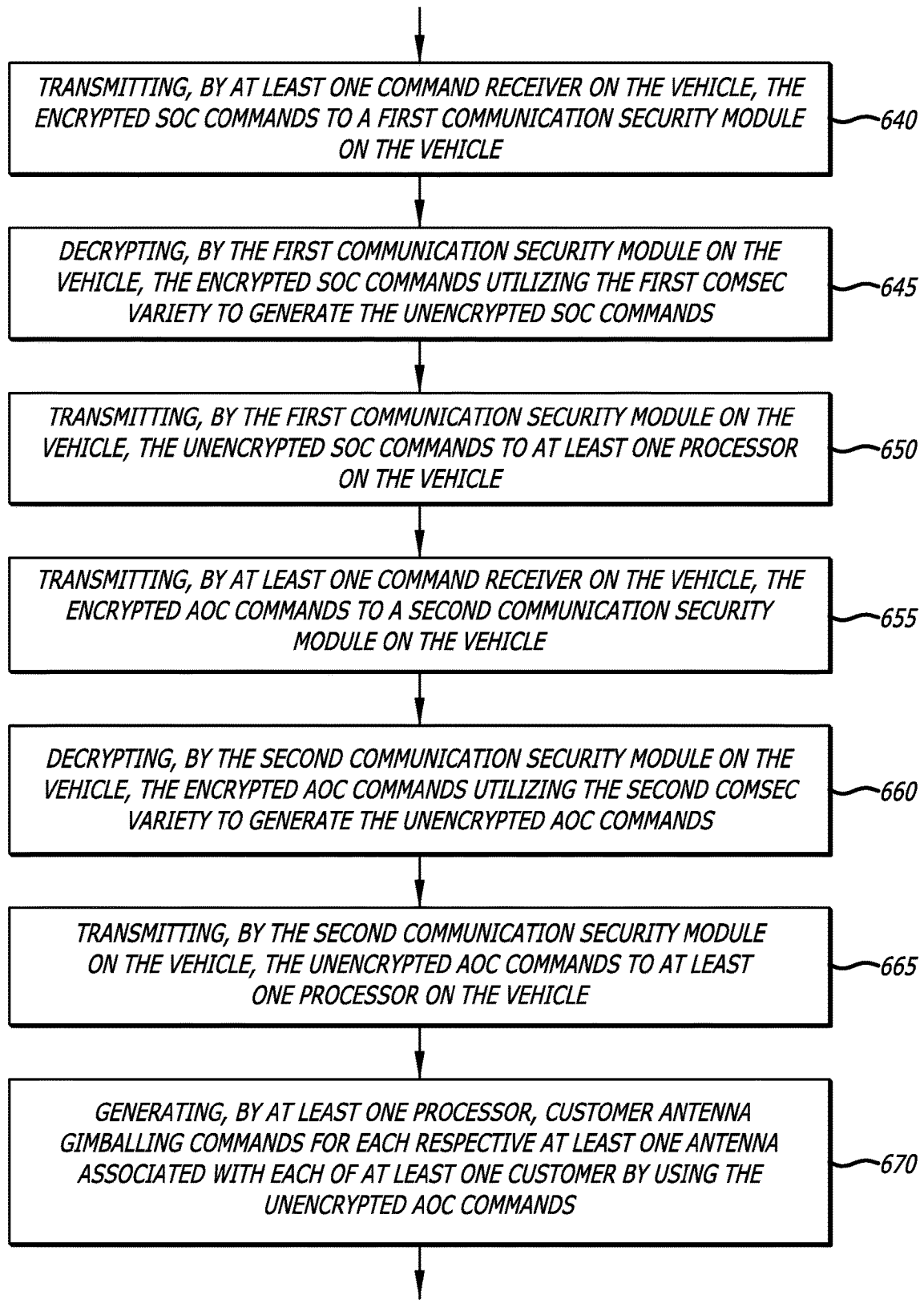
Figure 6C:
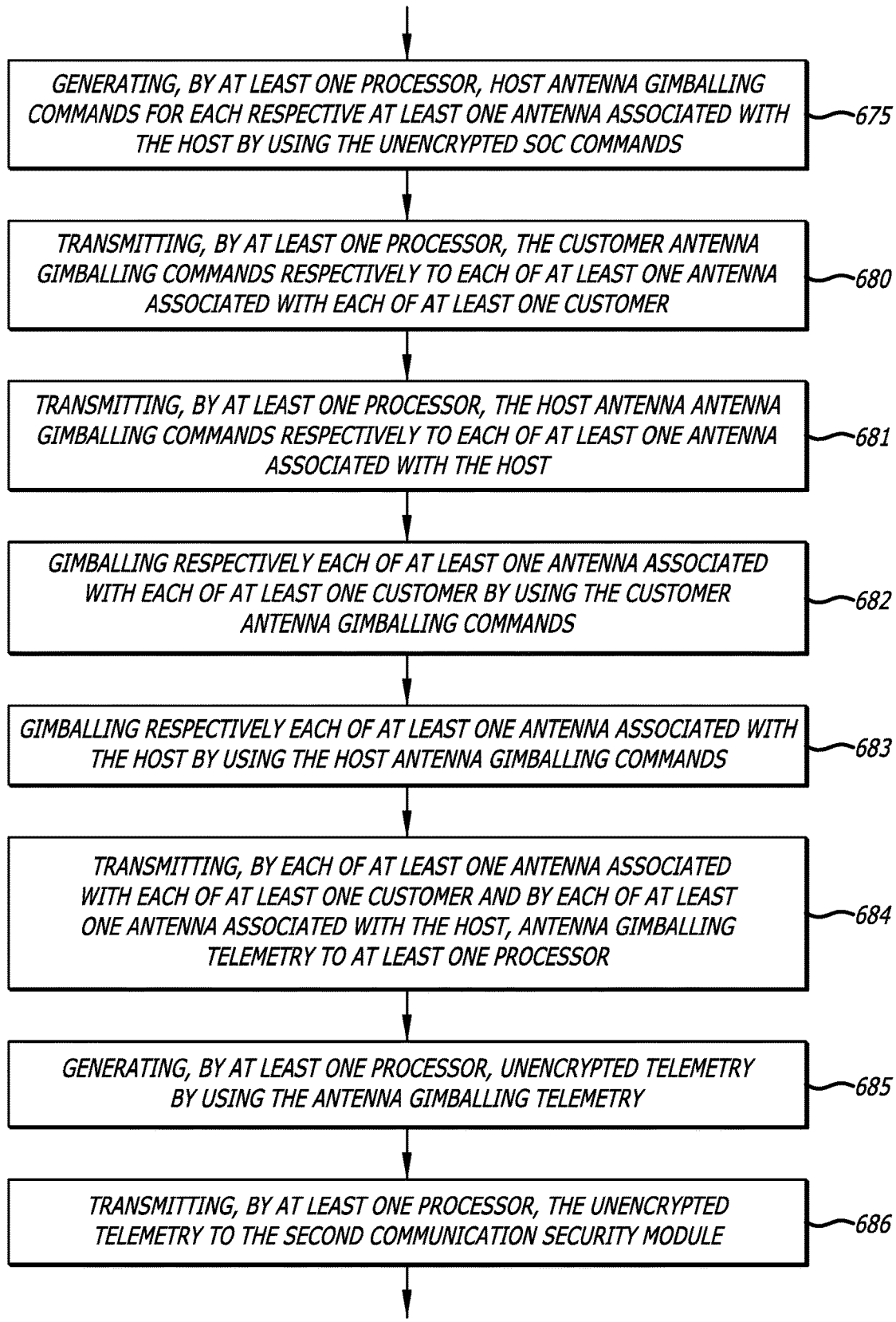

FIG. 5 is a diagram showing the disclosed system for secured multi-payload antennas operators operations utilizing an AOC uplink, a SOC, and a two COMSEC varieties for encryption, in accordance with at least one embodiment of the present disclosure.

FIGS. 6A, 6B, 6C, and 6D together show a flow chart for the disclosed method for secured multi-payload antennas operators operations utilizing an AOC uplink, a SOC, and a two COMSEC varieties for encryption, in accordance with at least one embodiment of the present disclosure.

Figure 7:
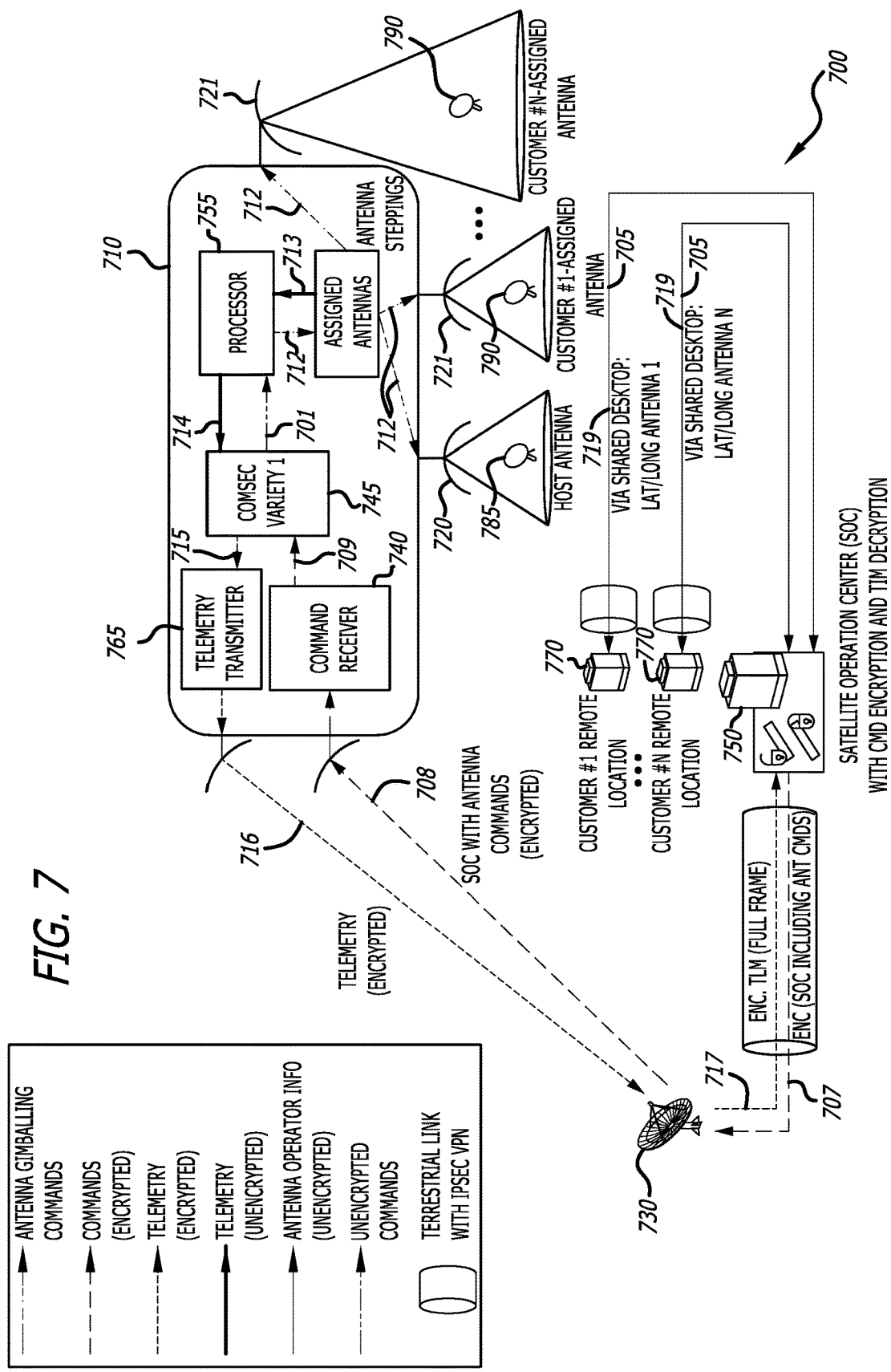
Figure 8C:
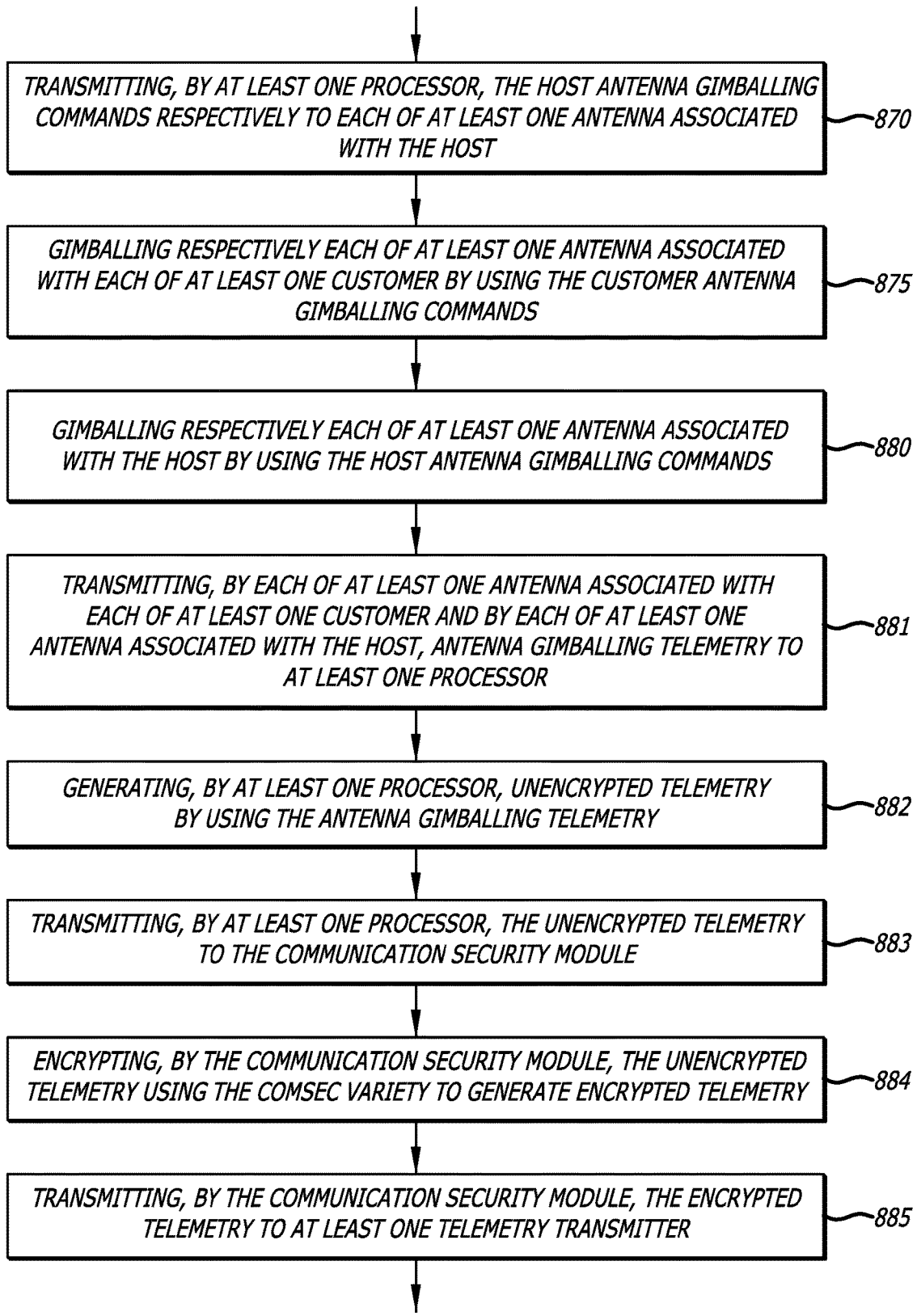
Figure 8D:
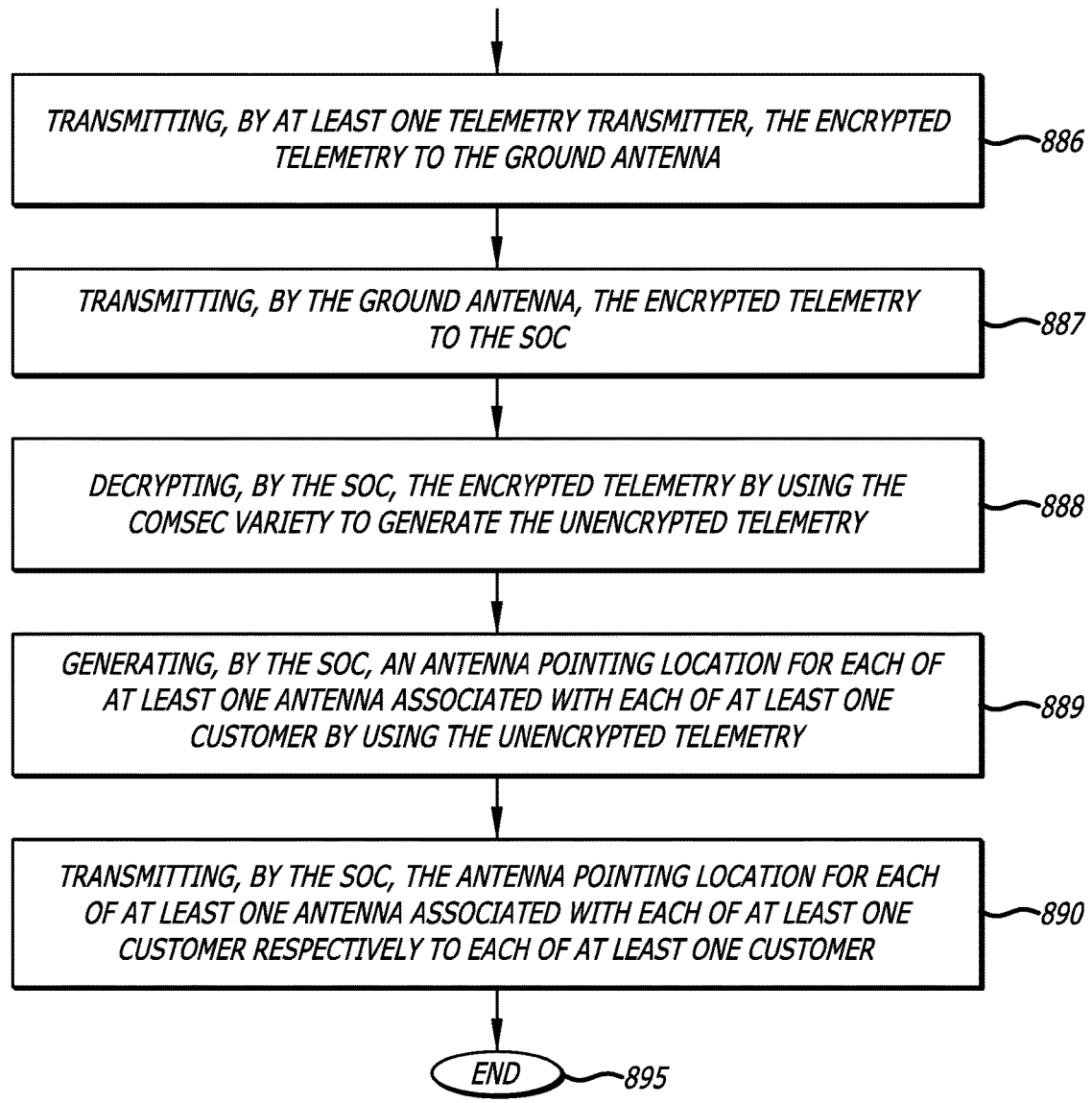

FIG. 7 is a diagram showing the disclosed system for secured multi-payload antennas operators operations utilizing a SOC uplink and a single COMSEC variety for encryption, in accordance with at least one embodiment of the present disclosure.

FIGS. 8A, 8B, 8C, and 8D together show a flow chart for the disclosed method for secured multi-payload antennas operators operations utilizing a SOC uplink and a single COMSEC variety for encryption, in accordance with at least one embodiment of the present disclosure.

Figure 9:
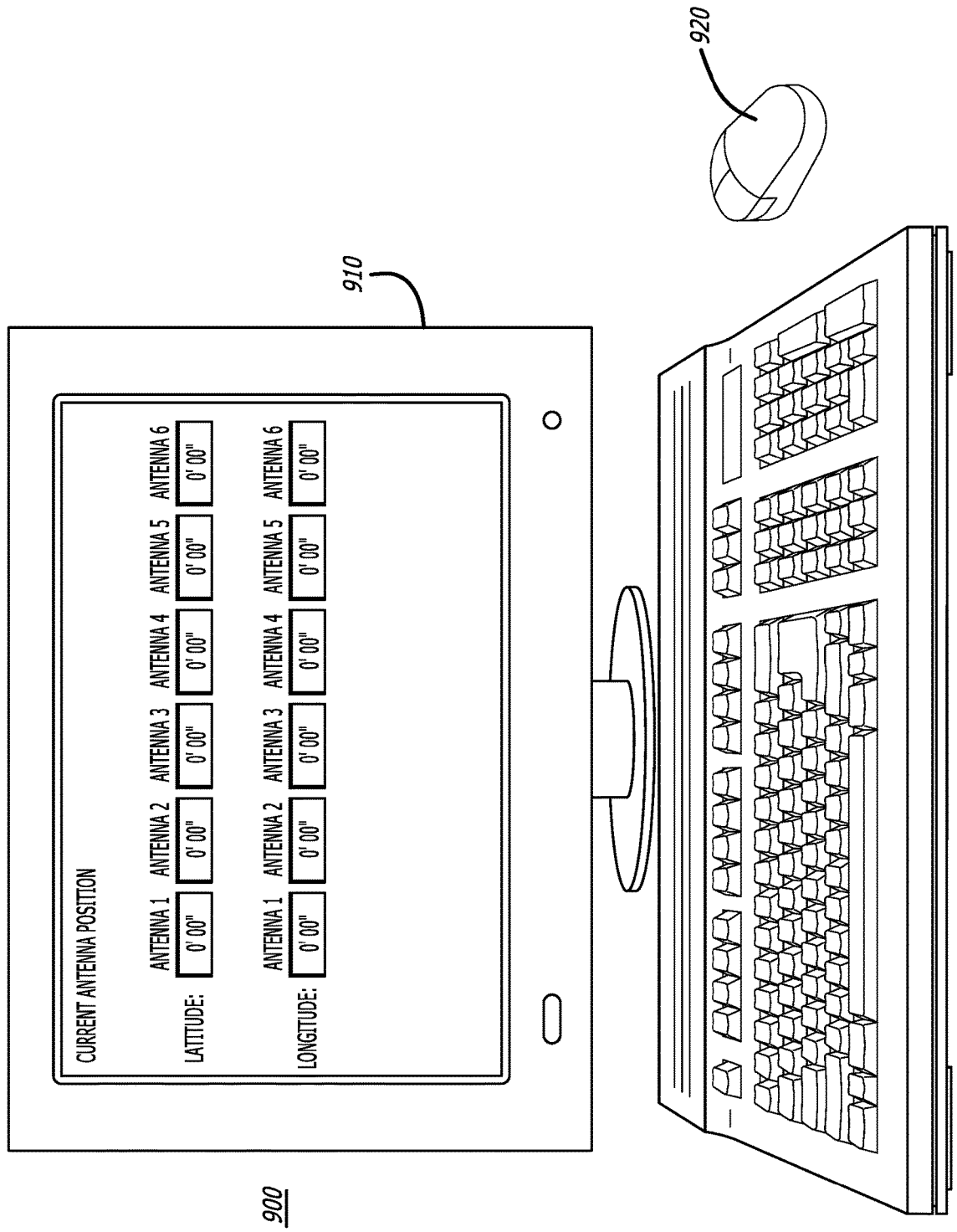

FIG. 9 is a diagram showing an exemplary graphical user interface (GUI) that may be employed for the disclosed system for secured multi-payload antennas operators operations, in accordance with at least one embodiment of the present disclosure.

DESCRIPTION

The methods and apparatus disclosed herein provide an operative system for secured multi-payload antennas operators operations. The system of the present disclosure allows for antenna operators to privately share vehicle resources (e.g., satellite reflector antennas).

As previously mentioned above, currently, typical antennas (e.g., reflector antennas) on a vehicle (e.g., a satellite) have the ability to be steered (i.e. gimbaled) to change their pointing location (e.g., to change their antenna beam boresight). All of this antenna steering is commanded and controlled by a single satellite controller (e.g., a host) with no resource allocation privacy for customers utilizing antennas on the vehicle.

The antennas (e.g., reflector antennas) of a satellite may be used by different entities. For example, one or more antennas may be used by the owner of the satellite (i.e. the host), one or more customers, or some combination thereof. For example, the owner of a satellite may lease different antennas to different customers. In one example, one group of antennas of the satellite may be leased to one customer, while a second group of antennas may be leased to a second customer.

Leasing a satellite to multiple customers may increase the revenues that an owner of a satellite can obtain. Further, a customer may use a subset of the total resources in a satellite for a cost that is less than the cost for the customer to purchase and operate a satellite, to build and operate a satellite, or to lease an entire satellite.

Customers of antennas of satellite systems desire independent and private operation of the satellite payload resources (e.g., satellite reflector antennas) from the owner/operator(s) (e.g., the host), such that the owner/operator(s) does not know how the payload customer is using the resources (e.g., such that the owner/operator(s) does not know where the antenna downlink transmissions are pointing, where the downlink data is being transmitted, how often the downlink data is being transmitted, etc.). Currently, all commands to the satellite go through the owner/operator(s), where the customer provides the commands (or alternatively specifies their desired results) to the operator/owner(s), thereby allowing the owner/operator(s) to know all of the details about the customer operations on the satellite. The owner/operator(s) then transmits the appropriate commands to the satellite and the satellite is reconfigured accordingly. All commands are generally sent via a single communication link.

The system of the present disclosure provides independent limited control to a non-owner/non-primary customer entity (e.g., a customer) to a predetermined portion of satellite payload resources (e.g., to one or more satellite reflector antennas) by allowing, in one or more embodiments, the customer to send unencrypted command type information (such as the latitude and longitude of the boresight of a downlink antenna beam(s)) to a privacy-isolated intermediate Antenna Operation Center (AOC). The AOC then uses the unencrypted command type information to create encrypted payload commands to send to a Satellite Operator Center (SOC), who then sends the encrypted payload commands to the satellite. Since the payload commands are encrypted, the SOC does not know the details of the commands. After the satellite has been reconfigured according to the commands (e.g., satellite reflector antennas have each been gimballed according to the specified latitude and longitude), the SOC receives encrypted telemetry commands from the satellite. The SOC then unencrypts the encrypted telemetry commands, and sends the unencrypted telemetry commands to the AOC. The AOC transforms the raw telemetry data to the particular command type information initially provided by the customer (e.g., the latitude and longitude of the boresight of a downlink antenna beam(s)), and then transmits the transformed information to the customer.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to satellite communication systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a diagram 100 showing the disclosed system for secured multi-payload antennas operators operations utilizing an antenna operations center (AOC) 160, a satellite operation center (SOC) 150 uplink 108, and a single communication security (COMSEC) variety (e.g., COMSEC variety 1) for encryption, in accordance with at least one embodiment of the present disclosure. In this figure, a vehicle 110, a satellite operation center (SOC) 150, an antenna operations center (AOC) 160, and multiple customers 170 (i.e. n number of customers, where n is greater than or equal to one) are shown. The customers 170 have each leased at least one antenna 121 on the vehicle 110 from the owner of a satellite (i.e. the SOC 150 (i.e. the host)). It should be noted that in some embodiments, the customers 170 may lease all of the antennas 120, 121 on the vehicle 110 from the owner of a satellite (i.e. the SOC 150). In these embodiments, the SOC commands, which will be discussed in further detail below, will simply be unoperational commands or nonexistent.

Various different types of vehicles 110 may be employed for the vehicle 110 including, but not limited to, an airborne vehicle. And, various different types of airborne vehicles may be employed for the vehicle 110 including, but not limited to, a satellite, an aircraft, an unmanned aerial vehicle (UAV), and a space plane. Additionally, various different types of satellites may be employed for the vehicle 110 including, but not limited to geosynchronous earth orbit (GEO) satellites, medium earth orbit (MEO), lower earth orbit (LEO), and highly elliptical orbit (HEO) satellites.

During operation, each customer 170 generates an antenna pointing request for each antenna 121 associated with the customer 170. For example, Customer #1 170 generates an antenna pointing request for the Customer #1 assigned antenna 121 on the vehicle 110. There may be various different ways the customer 170 generates the antenna pointing request. In one or more embodiments, the customer 170 utilizes a graphical user interface (GUI) (e.g., at the customer's 170 remote location) to select (or input) a specific latitude and longitude location for the boresight of the antenna beam for each antenna on the vehicle 110 that the customer is leasing. One example GUI that may be employed is shown in FIG. 9.

FIG. 9 is a diagram 900 showing an exemplary graphical user interface (GUI) that may be employed for the disclosed system for secured multi-payload antennas operators operations, in accordance with at least one embodiment of the present disclosure. In this figure, a computer screen 910 is shown to be displaying input boxes for the latitude and longitude of the desired location of the boresight of the antenna beam for six different antennas. In one or more embodiments, the customer may use the mouse 920 (or some other means) to select which input box to type in a desired latitude and longitude for a boresight of an antenna that the customer is using on the vehicle 110. Then, the customer may simply type in the latitude number and longitude number for the desired location. For example, if the customer is using Antenna 1 and desires the boresight of the antenna beam for Antenna 1 to be located in Berlin, Germany, the customer will type in "52.520007" degrees in the Latitude input box for Antenna 1 and type in "13.404954" degrees in the Longitude input box for Antenna 1. In some embodiments, after doing so, the computer screen 910 will display the corresponding antenna beam boresight location on a map.

Referring back to FIG. 1, after each customer 170 generates an antenna pointing request (e.g., a specific latitude and longitude location for the boresight of the antenna beam) for each antenna 121 associated with the customer 170, each customer 170 then transmits 105 (e.g., via a web browser over the internet (e.g., via a terrestrial link with Internet protocol security (IPsec) over a virtual private network (VPN)) their antenna pointing requests to the AOC 160. In one or more embodiments, the antenna pointing requests are transmitted 105 without encryption. However, in other embodiments, there may be a point-to-point encryption utilized between the customers 170 and the AOC 160.

After the AOC 160 receives the antenna pointing requests from the customers 170, the AOC 160 generates unencrypted AOC commands using the antenna pointing requests. The unencrypted AOC commands are commands that are used to command the gimballing mechanism for each antenna 121 associated with a customer 170 according to their respective antenna pointing requests. For example, if Customer #1 170 has specified that the Customer #1 assigned antenna 121 should be gimballed such that the latitude and longitude of the antenna beam of the Customer #1 assigned antenna 121 be located at Berlin, Germany, and the latitude and longitude of the antenna beam of the Customer #1 assigned antenna 121 is currently at London, England; the unencrypted AOC commands will specify that the gimballing mechanism (e.g., stepper motor) on the vehicle 110 gimbal (i.e. steer) the Customer #1 assigned antenna 121 accordingly (e.g., ten steps in azimuth and one step in elevation).

After the AOC 160 has generated the unencrypted AOC commands, the AOC 160 transmits 106 (e.g., via a terrestrial link with internet protocol security (IPsec) over a virtual private network (VPN)) the unencrypted AOC commands to the SOC 150. The SOC 150 then encrypts the unencrypted AOC commands utilizing a communication security (COMSEC) variety to generate encrypted AOC commands. It should be noted that the COMSEC variety may include at least one encryption key and/or at least one algorithm (e.g., a Type 1 encryption algorithm or a Type 2 encryption algorithm).

The SOC 150 also encrypts unencrypted SOC commands using the COMSEC variety to generate encrypted SOC commands. It should be noted that the unencrypted SOC commands are commands that are used to command the gimballing mechanism for each antenna 120 associated with the host (i.e. the SOC 150) according to the host's respective antenna pointing requests. Similar to the unencrypted AOC commands, the unencrypted SOC commands will specify that the gimballing mechanism (e.g., stepper motor) on the vehicle 110 gimbal (i.e. steer) each host assigned antenna 120 accordingly.

The SOC 150 will then transmit 107 (e.g., via a terrestrial link with internet protocol security (IPsec) over a virtual private network (VPN)) the encrypted AOC commands and the encrypted SOC commands to a ground antenna 130. It should be noted that, although in FIG. 1 the SOC 150 is depicted to be located far from the ground antenna 130, in some embodiments, the ground antenna 130 may be located right next to the SOC 150.

Then, the ground antenna 130 transmits 108 the encrypted AOC commands and the encrypted SOC commands to the vehicle 110. The ground antenna 130 transmits 108 the encrypted AOC commands and the encrypted SOC commands utilizing an out-of-band frequency band(s) (i.e. a frequency band(s) that is not the same frequency band(s) utilized by the antennas 120, 121 to transmit payload data). A command receiver 140 on the vehicle 110 receives the encrypted AOC commands and the encrypted SOC commands. It should be noted that in other embodiments, the disclosed system may employ more than one command receiver 140 than as is shown in FIG. 1.

The command receiver 140 then transmits 109 the encrypted AOC commands and the encrypted SOC commands to a communication security module 145. The communication security module 145 decrypts the encrypted AOC commands utilizing the COMSEC variety to generate the unencrypted AOC commands. Also, the communication security module 145 decrypts the encrypted SOC commands utilizing the COMSEC variety (e.g., COMSEC Variety 1) to generate the unencrypted SOC commands.

It should be noted that the communication security module 145 may comprise one or more modules. In addition, the communication security module 145 may comprise one or more processors.

The communication security module 145 then transmits 101, 111 the unencrypted AOC commands and the unencrypted SOC commands to at least one processor 155. The processor(s) 155 then generates customer antenna gimballing commands (e.g., machine commands for the gimballing mechanism stepper motor for each antenna) for each customer antenna 121 by using the unencrypted AOC commands. The processor(s) 155 also generates host antenna gimballing commands (e.g., machine commands for the gimballing mechanism stepper motor for each antenna) for each host antenna 120 by using the unencrypted SOC commands.

The processor(s) 155 then transmits 112 the customer antenna gimballing commands respectively to each customer antenna 121. The gimballing mechanism for each customer antenna 121 gimbals (i.e. steers) its respective customer antenna 121 according to its specific customer antenna gimballing commands. Each customer antenna 121 transmits payload data in its respective antenna beam to at least one customer receiving antenna 190 on the ground.

The processor(s) 155 also transmits 112 the host antenna gimballing commands respectively to each host antenna 120. The gimballing mechanism for each host antenna 120 gimbals (i.e. steers) its respective host antenna 120 according to its specific host antenna gimballing commands. Each host antenna 120 transmits payload data in its respective antenna beam to at least one host receiving antenna 185 on the ground.

It should be noted that in one or more embodiments, each customer antenna 121 and/or each host antenna 120 comprise a reflector and a gimballing mechanism to gimbal (i.e. steer) the reflector. In some embodiments, each customer antenna 121 and/or each host antenna 120 comprise at least two reflectors (i.e. a main reflector and at least one subreflector) and a gimballing mechanism to gimbal (i.e. steer) the main reflector. It should be noted that the main reflector and/or the subreflector(s) may be parabolic reflectors or shaped reflectors. In the embodiments where each customer antenna 121 and/or each host antenna 120 comprise two reflectors (i.e. a main reflector and one subreflector) and a gimballing mechanism to gimbal (i.e. steer) the main reflector, the reflectors (i.e. the main reflector and the subreflector) may be arranged in a Gregorian reflector antenna configuration or a Cassegrain antenna configuration. In other embodiments, each customer antenna 121 and/or each host antenna 120 comprise at least one direct radiating horn antenna (e.g., an array of horn antennas) and a gimballing mechanism to gimbal (i.e. steer) the direct radiating horn antenna(s) (e.g., the gimballing mechanism gimbals the horns individually or the gimballing mechanism gimbals a platform, where the direct radiating horn antennas are mounted onto the platform).

Then, each customer antenna 121 and each host antenna 120 transmit 113 antenna gimballing telemetry (e.g., machine telemetry indicating that the antenna has been gimballed accordingly) from their respective gimballing mechanisms to the processor(s) 155. The processor(s) 155 then generates unencrypted telemetry by using the gimballing telemetry.

Then, the processor(s) 155 transmits 114 the unencrypted telemetry to the communication security module 145. The communication security module 145 encrypts the unencrypted telemetry using the COMSEC variety (e.g., COMSEC variety 1) to generate encrypted telemetry. Then the communication security module 145 transmits 115 the encrypted telemetry to a telemetry transmitter 165. It should be noted that in other embodiments, the disclosed system may employ more than one telemetry transmitter 165 than as is shown in FIG. 1.

Then, the telemetry transmitter 165 transmits 116 the encrypted telemetry to the ground antenna 130. The telemetry transmitter 165 transmits 116 the encrypted telemetry utilizing an out-of-band frequency band(s) (i.e. a frequency band(s) that is not the same frequency band(s) utilized by the antennas 120, 121 to transmit payload data).

The ground antenna 130 then transmits 117 (e.g., via a terrestrial link with internet protocol security (IPsec) over a virtual private network (VPN)) the encrypted telemetry to the SOC 150. The SOC 150 then decrypts the encrypted telemetry using the COMSEC variety to generate the unencrypted telemetry. The SOC 150 then utilizes a database that comprises host antenna decommutated information and does not comprise customer antenna decommutated information (i.e. a database without customer antenna decommutated information) to read to unencrypted telemetry to determine the telemetry data related to the antenna(s) 120 that is utilized by the SOC 150 (i.e. the host).

Then, the SOC 150 transmits 118 (e.g., via a terrestrial link with internet protocol security (IPsec) over a virtual private network (VPN)) the unencrypted telemetry to the AOC 160. The AOC 160 then utilizes a database that comprises customer antenna decommutated information and does not comprise host antenna decommutated information (i.e. a database without host antenna decommutated information) to read to unencrypted telemetry to determine the telemetry data related to the antenna(s) 121 that is utilized by the customers 170. The AOC 160 then generates an antenna pointing location (e.g., the specific latitude and longitude location for the boresight of the antenna beam) for each antenna 121 associated with each customer 170 by using the unencrypted telemetry. Then, the AOC 160 transmits 119 (e.g., via a web browser over the internet (e.g., via a terrestrial link with internet protocol security (IPsec) over a virtual private network (VPN)) the antenna pointing location for each antenna 121 associated with each customer 170 respectively to each customer 170. Then, in one or more embodiments, the antenna pointing location (e.g., the specific latitude and longitude location for the boresight of the antenna beam) for each antenna 121 associated with each customer 170 will be displayed respectively on a computer screen 910 (refer to FIG. 9) associated with each customer 170.

FIGS. 2A, 2B, 2C, and 2D together show a flow chart for the disclosed method for secured multi-payload antennas operators operations utilizing an AOC, a SOC uplink, and a single COMSEC variety for encryption, in accordance with at least one embodiment of the present disclosure. At the start 200 of the method, at least one customer transmits an antenna location pointing request for each of at least one antenna associated with each of at least one customer to an antenna operations center (AOC) 205. Then, the AOC generates unencrypted AOC commands using the antenna location pointing request for each of at least one antenna 210. The AOC then transmits the unencrypted AOC commands to a satellite operation center (SOC) 215. Then, the SOC encrypts the unencrypted AOC commands utilizing a communication security (COMSEC) variety to generate encrypted AOC commands 220. The SOC also encrypts the unencrypted SOC commands utilizing the COMSEC variety to generate encrypted SOC commands, where the unencrypted SOC commands are related to at least one antenna associated with a host 225. The SOC then transmits the encrypted AOC commands and the encrypted SOC commands to a ground antenna 230. The ground antenna then transmits the encrypted AOC commands and the encrypted SOC commands to at least one command receiver on a vehicle 235.

Then, at least one command receiver on the vehicle transmits the encrypted AOC commands and the encrypted SOC commands to a communication security module on the vehicle 240. The communication security module on the vehicle then decrypts the encrypted AOC commands utilizing the COMSEC variety to generate the unencrypted AOC commands 245. The communication security module on the vehicle also decrypts the encrypted SOC commands utilizing the COMSEC variety to generate the unencrypted SOC commands 250. Then, the communication security module on the vehicle transmits the unencrypted AOC commands and the unencrypted SOC commands to at least one processor on the vehicle 255. At least one processor then generates customer antenna gimballing commands for each respective at least one antenna associated with each of at least one customer by using the unencrypted AOC commands 260. Also, at least one processor generates host antenna gimballing commands for each respective at least one antenna associated with the host by using the unencrypted SOC commands 265. At least one processor transmits the customer antenna gimablling commands respectively to each of at least one antenna associated with each of at least one customer 270. Also, at least one processor transmits the host antenna gimballing commands respectively to each of at least one antenna associated with the host 275. Then, each of at least one antenna associated with each of at least one customer is respectively gimballed by using the customer antenna gimballing commands 280. Also, each of at least one antenna associated with the host is respectively gimballed using the host gimballing commands 281.

Then, each of at least one antenna associated with each of at least one customer and each of at least one antenna associated with the host transmit antenna transmit gimballing telemetry to at least one processor 282. At least one processor then generates unencrypted telemetry by using the antenna gimballing telemetry 283. Then, at least one processor transmits the unencrypted telemetry to the communication security module 284. The communication security module then encrypts the unencrypted telemetry using the COMSEC variety to generate encrypted telemetry 285. Then, the communication security module transmits the encrypted telemetry to at least one telemetry transmitter 286. At least one telemetry transmitter then transmits the encrypted telemetry to the ground antenna 287.

The ground antenna then transmits the encrypted telemetry to the SOC 288. Then, the SOC decrypts the encrypted telemetry utilizing the COMSEC variety to generate the unencrypted telemetry 289. The SOC then transmits the unencrypted telemetry to the AOC 290. Then, the AOC generates an antenna pointing location for each of at least one antenna associated with each of at least one customer by using the encrypted telemetry 291. The AOC then transmits the antenna pointing location for each of at least one antenna associated with each of at least one customer respectively to each of at least one customer 292. Then, the method ends 293.

FIG. 3 is a diagram 300 showing the disclosed system for secured multi-payload antennas operators operations utilizing a client (e.g., a workstation (w/s)) 360, a SOC uplink 308, and a single COMSEC variety (e.g., COMSEC variety 1) for encryption, in accordance with at least one embodiment of the present disclosure. In this figure, a vehicle 310, a satellite operation center (SOC) 351 (i.e. comprising a SOC primary server 350 and a client (e.g., a workstation (w/s)) 360), and multiple customers 370 (i.e. n number of customers, where n is greater than or equal to one) are shown. The customers 370 have each leased at least one antenna 321 on the vehicle 310 from the owner of a satellite (i.e. the SOC 351 (i.e. the host)). It should be noted that in some embodiments, the customers 370 may lease all of the antennas 320, 321 on the vehicle 310 from the owner of a satellite (i.e. the SOC 351). In these embodiments, the SOC commands, which will be discussed in further detail below, will simply be unoperational commands or nonexistent.

Various different types of vehicles 310 may be employed for the vehicle 310 including, but not limited to, an airborne vehicle. And, various different types of airborne vehicles may be employed for the vehicle 310 including, but not limited to, a satellite, an aircraft, an unmanned aerial vehicle (UAV), and a space plane. Additionally, various different types of satellites may be employed for the vehicle 310 including, but not limited to geosynchronous earth orbit (GEO) satellites, medium earth orbit (MEO), lower earth orbit (LEO), and highly elliptical orbit (HEO) satellites.

During operation, each customer 370 generates an antenna pointing request for each antenna 321 associated with the customer 370. For example, Customer #1 370 generates an antenna pointing request for the Customer #1 assigned antenna 321 on the vehicle 310. There may be various different ways the customer 370 generates the antenna pointing request. In one or more embodiments, the customer 370 utilizes a graphical user interface (GUI) (e.g., at the customer's 370 remote location) to select (or input) a specific latitude and longitude location for the boresight of the antenna beam for each antenna on the vehicle 310 that the customer is leasing. One example GUI that may be employed is shown in FIG. 9. A discussion regarding the details of the GUI in FIG. 9 can be found above.

After each customer 370 generates an antenna pointing request (e.g., a specific latitude and longitude location for the boresight of the antenna beam) for each antenna 321 associated with the customer 370, each customer 370 then transmits 305 (e.g., via a web browser over the internet (e.g., via a terrestrial link with internet protocol security (IPsec) over a virtual private network (VPN)) their antenna pointing requests to the client 360. In one or more embodiments, the antenna pointing requests are transmitted 305 without encryption. However, in other embodiments, there may be a point-to-point encryption utilized between the customers 370 and the client 360.

It should be noted that the client 360 is located at or near the SOC primary server 350. The client 360 serves as a buffer between the customers 370 and the SOC primary server 350 to add a layer of security for the SOC primary server 350.

After the client 360 receives the antenna pointing requests from the customers 370, the client 360 generates unencrypted customer commands using the antenna pointing requests. The unencrypted customer commands are commands that are used to command the gimballing mechanism for each antenna 321 associated with a customer 370 according to their respective antenna pointing requests. For example, if Customer #1 370 has specified that the Customer #1 assigned antenna 321 should be gimballed such that the latitude and longitude of the antenna beam of the Customer #1 assigned antenna 321 be located at Berlin, Germany, and the latitude and longitude of the antenna beam of the Customer #1 assigned antenna 321 is currently at London, England; the unencrypted customer commands will specify that the gimballing mechanism (e.g., stepper motor) on the vehicle 310 gimbal (i.e. steer) the Customer #1 assigned antenna 321 accordingly (e.g., ten steps in azimuth and one step in elevation).

After the client 360 has generated the unencrypted customer commands, the client 360 transmits 306 the unencrypted customer commands to the SOC primary server 350. The SOC primary server 350 then encrypts the unencrypted customer commands utilizing a communication security (COMSEC) variety to generate encrypted customer commands. It should be noted that the COMSEC variety may include at least one encryption key and/or at least one algorithm (e.g., a Type 1 encryption algorithm or a Type 2 encryption algorithm).

The SOC primary server 350 also encrypts unencrypted SOC commands using the COMSEC variety to generate encrypted SOC commands. It should be noted that the unencrypted SOC commands are commands that are used to command the gimballing mechanism for each antenna 320 associated with the host (i.e. the SOC 351) according to the host's respective antenna pointing requests. Similar to the unencrypted customer commands, the unencrypted SOC commands will specify that the gimballing mechanism (e.g., stepper motor) on the vehicle 310 gimbal (i.e. steer) each host assigned antenna 320 accordingly.

The SOC primary server 350 will then transmit 307 (e.g., via a terrestrial link with internet protocol security (IPsec) over a virtual private network (VPN)) the encrypted customer commands and the encrypted SOC commands to a ground antenna 330. It should be noted that, although in FIG. 3 the SOC 351 is depicted to be located far from the ground antenna 330, in some embodiments, the ground antenna 330 may be located right next to the SOC 351.

Then, the ground antenna 330 transmits 308 the encrypted customer commands and the encrypted SOC commands to the vehicle 310. The ground antenna 330 transmits 308 the encrypted customer commands and the encrypted SOC commands utilizing an out-of-band frequency band(s) (i.e. a frequency band(s) that is not the same frequency band(s) utilized by the antennas 320, 321 to transmit payload data). A command receiver 340 on the vehicle 310 receives the encrypted customer commands and the encrypted SOC commands. It should be noted that in other embodiments, the disclosed system may employ more than one command receiver 340 than as is shown in FIG. 3.

The command receiver 340 then transmits 309 the encrypted customer commands and the encrypted SOC commands to a communication security module 345. The communication security module 345 decrypts the encrypted customer commands utilizing the COMSEC variety to generate the unencrypted customer commands. Also, the communication security module 345 decrypts the encrypted SOC commands utilizing the COMSEC variety (e.g., COMSEC Variety 1) to generate the unencrypted SOC commands.

It should be noted that the communication security module 345 may comprise one or more modules. In addition, the communication security module 345 may comprise one or more processors.

The communication security module 345 then transmits 301 the unencrypted customer commands and the unencrypted SOC commands to at least one processor 355. The processor(s) 355 then generates customer antenna gimballing commands (e.g., machine commands for the gimballing mechanism stepper motor for each antenna) for each customer antenna 321 by using the unencrypted customer commands. The processor(s) 355 also generates host antenna gimballing commands (e.g., machine commands for the gimballing mechanism stepper motor for each antenna) for each host antenna 320 by using the unencrypted SOC commands.

The processor(s) 355 then transmits 312 the customer antenna gimballing commands respectively to each customer antenna 321. The gimballing mechanism for each customer antenna 321 gimbals (i.e. steers) its respective customer antenna 321 according to its specific customer antenna gimballing commands. Each customer antenna 321 transmits payload data in its respective antenna beam to at least one customer receiving antenna 390 on the ground.

The processor(s) 355 also transmits 312 the host antenna gimballing commands respectively to each host antenna 320. The gimballing mechanism for each host antenna 320 gimbals (i.e. steers) its respective host antenna 320 according to its specific host antenna gimballing commands. Each host antenna 320 transmits payload data in its respective antenna beam to at least one host receiving antenna 385 on the ground.

It should be noted that in one or more embodiments, each customer antenna 321 and/or each host antenna 320 comprise a reflector and a gimballing mechanism to gimbal (i.e. steer) the reflector. In some embodiments, each customer antenna 321 and/or each host antenna 320 comprise at least two reflectors (i.e. a main reflector and at least one subreflector) and a gimballing mechanism to gimbal (i.e. steer) the main reflector. It should be noted that the main reflector and/or the subreflector(s) may be parabolic reflectors or shaped reflectors. In the embodiments where each customer antenna 321 and/or each host antenna 320 comprise two reflectors (i.e. a main reflector and one subreflector) and a gimballing mechanism to gimbal (i.e. steer) the main reflector, the reflectors (i.e. the main reflector and the subreflector) may be arranged in a Gregorian reflector antenna configuration or a Cassegrain antenna configuration. In other embodiments, each customer antenna 321 and/or each host antenna 320 comprise at least one direct radiating horn antenna (e.g., an array of horn antennas) and a gimballing mechanism to gimbal (i.e. steer) the direct radiating horn antenna(s) (e.g., the gimballing mechanism gimbals the horns individually or the gimballing mechanism gimbals a platform, where the direct radiating horn antennas are mounted onto the platform).

Then, each customer antenna 321 and each host antenna 320 transmit 313 antenna gimballing telemetry (e.g., machine telemetry indicating that the antenna has been gimballed accordingly) from their respective gimballing mechanisms to the processor(s) 355. The processor(s) 355 then generates unencrypted telemetry by using the gimballing telemetry.

Then, the processor(s) 355 transmits 314 the unencrypted telemetry to the communication security module 345. The communication security module 345 encrypts the unencrypted telemetry using the COMSEC variety (e.g., COMSEC variety 1) to generate encrypted telemetry. Then the communication security module 345 transmits 315 the encrypted telemetry to a telemetry transmitter 365. It should be noted that in other embodiments, the disclosed system may employ more than one telemetry transmitter 365 than as is shown in FIG. 3.

Then, the telemetry transmitter 365 transmits 316 the encrypted telemetry to the ground antenna 330. The telemetry transmitter 365 transmits 316 the encrypted telemetry utilizing an out-of-band frequency band(s) (i.e. a frequency band(s) that is not the same frequency band(s) utilized by the antennas 320, 321 to transmit payload data).

The ground antenna 330 then transmits 317 (e.g., via a terrestrial link with internet protocol security (IPsec) over a virtual private network (VPN)) the encrypted telemetry to the SOC primary server 350. The SOC primary server 350 then decrypts the encrypted telemetry using the COMSEC variety to generate the unencrypted telemetry. The SOC primary server 350 then utilizes a database that comprises host antenna decommutated information and does not comprise customer antenna decommutated information (i.e. a database without customer antenna decommutated information) to read to unencrypted telemetry to determine the telemetry data related to the antenna(s) 320 that is utilized by the SOC 351 (i.e. the host).

Then, the SOC primary server 350 transmits 318 the unencrypted telemetry to the client 360. The client 360 then utilizes a database that comprises customer antenna decommutated information and does not comprise host antenna decommutated information (i.e. a database without host antenna decommutated information) to read to unencrypted telemetry to determine the telemetry data related to the antenna(s) 321 that is utilized by the customers 370. The client 360 then generates an antenna pointing location (e.g., the specific latitude and longitude location for the boresight of the antenna beam) for each antenna 321 associated with each customer 370 by using the unencrypted telemetry. Then, the client 360 transmits 319 (e.g., via a web browser over the internet (e.g., via a terrestrial link with internet protocol security (IPsec) over a virtual private network (VPN)) the antenna pointing location for each antenna 321 associated with each customer 370 respectively to each customer 370. Then, in one or more embodiments, the antenna pointing location (e.g., the specific latitude and longitude location for the boresight of the antenna beam) for each antenna 321 associated with each customer 370 will be displayed respectively on a computer screen 910 (refer to FIG. 9) associated with each customer 370.

FIGS. 4A, 4B, 4C, and 4D together show a flow chart for the disclosed method for secured multi-payload antennas operators operations utilizing a client, a SOC uplink, and a single COMSEC variety for encryption, in accordance with at least one embodiment of the present disclosure. At the start 400 of the method, at least one customer transmits an antenna location pointing request for each of at least one antenna associated with each of at least one customer to a client 405. Then, the client generates unencrypted customer commands using the antenna location pointing request for each of at least one antenna 410. The client then transmits the unencrypted customer commands to a satellite operation center (SOC) primary server 415. Then, the SOC primary server encrypts the unencrypted customer commands utilizing a communication security (COMSEC) variety to generate encrypted customer commands 420. Also, the SOC primary server encrypts unencrypted SOC commands utilizing the COMSEC variety to generate encrypted SOC commands, where the unencrypted SOC commands are related to at least one antenna associated with a host 425. Then, the SOC transmits the encrypted customer commands and the encrypted SOC commands to a ground antenna 430. Then, the ground antenna transmits the encrypted customer commands and the encrypted SOC commands to at least one command receiver on the vehicle 435.

At least one command receiver on the vehicle then transmits the encrypted customer commands and the encrypted SOC commands to a communication security module on the vehicle 440. The communication security module on the vehicle then decrypts the encrypted customer commands utilizing the COMSEC variety to generate the unencrypted customer commands 445. Also, the communication security module on the vehicle decrypts the encrypted SOC commands utilizing the COMSEC variety to generate unencrypted SOC commands 450. Then, the communication security module on the vehicle transmits the unencrypted customer commands and the unencrypted SOC commands to at least one processor on the vehicle 455. At least one processor then generates customer antenna gimballing commands for each respective at least one antenna associated with each of at least one customer by using the unencrypted customer commands 460. Also, at least one processor generates host antenna gimballing commands for each respective at least one antenna associated with the host by using the unencrypted SOC commands 465. At least one processor then transmits the customer antenna gimballing commands respectively to each of at least one antenna associated with each of at least one customer 470. Also, at least one processor transmits the host antenna gimballing commands respectively to each of at least one antenna associated with the host 475. Then, each of at least one antenna associated with each of at least one customer is respectively gimballed by using the customer antenna gimballing commands 480. Also, each of at least one antenna associated with the host is respectively gimballed by using the host antenna gimballing commands 481.

Then, each of at least one antenna associated with each of at least one customer and each of at least one antenna associated with the host transmit antenna gimballing telemetry to at least one processor 482. At least one processor then generates unencrypted telemetry by using the antenna gimballing telemetry 483. Then, at least one processor transmits the unencrypted telemetry to the communication security module 484. The communication security module then encrypts the unencrypted telemetry using the COMSEC variety to generate encrypted telemetry 485. Then, the communication security module transmits the encrypted telemetry to at least one telemetry transmitter 486. Then, at least one telemetry transmitter transmits the encrypted telemetry to the ground antenna 487.

Then, the ground antenna transmits the encrypted telemetry to the SOC primary server 488. The SOC primary server then decrypts the encrypted telemetry utilizing the COMSEC variety to generate the unencrypted telemetry 489. Then, the SOC primary server transmits the unencrypted telemetry to the client 490. The client then generates an antenna pointing location for each of at least one antenna associated with each of at least one customer by using the unencrypted telemetry 491. Then, the client transmits the antenna pointing location for each of at least one antenna associated with each of at least one customer respectively to each of at least one customer 492. Then, the method ends 493.

FIG. 5 is a diagram 500 showing the disclosed system for secured multi-payload antennas operators operations utilizing an AOC 560 uplink 508, a SOC 550, and a two COMSEC varieties (e.g., COMSEC variety 1 and COMSEC variety 2) for encryption, in accordance with at least one embodiment of the present disclosure. In this figure, a vehicle 510, a satellite operation center (SOC) 550, an antenna operations center (AOC) 560, and multiple customers 570 (i.e. n number of customers, where n is greater than or equal to one) are shown. The customers 570 have each leased at least one antenna 521 on the vehicle 510 from the owner of a satellite (i.e. the SOC 550 (i.e. the host)). It should be noted that in some embodiments, the customers 570 may lease all of the antennas 520, 521 on the vehicle 510 from the owner of a satellite (i.e. the SOC 550). In these embodiments, the SOC commands, which will be discussed in further detail below, will simply be unoperational commands or nonexistent.

Various different types of vehicles 510 may be employed for the vehicle 510 including, but not limited to, an airborne vehicle. And, various different types of airborne vehicles may be employed for the vehicle 510 including, but not limited to, a satellite, an aircraft, an unmanned aerial vehicle (UAV), and a space plane. Additionally, various different types of satellites may be employed for the vehicle 510 including, but not limited to geosynchronous earth orbit (GEO) satellites, medium earth orbit (MEO), lower earth orbit (LEO), and highly elliptical orbit (HEO) satellites.

During operation, each customer 570 generates an antenna pointing request for each antenna 521 associated with the customer 570. For example, Customer #1 570 generates an antenna pointing request for the Customer #1 assigned antenna 521 on the vehicle 510. There may be various different ways the customer 570 generates the antenna pointing request. In one or more embodiments, the customer 570 utilizes a graphical user interface (GUI) (e.g., at the customer's 570 remote location) to select (or input) a specific latitude and longitude location for the boresight of the antenna beam of for each antenna on the vehicle 510 that the customer is leasing. One example GUI that may be employed is shown in FIG. 9. A discussion regarding the details of the GUI in FIG. 9 can be found above.

After each customer 570 generates an antenna pointing request (e.g., a specific latitude and longitude location for the boresight of the antenna beam) for each antenna 521 associated with the customer 570, each customer 570 then transmits 505 (e.g., via a web browser over the internet (e.g., via a terrestrial link with internet protocol security (IPsec) over a virtual private network (VPN)) their antenna pointing requests to the AOC 560. In one or more embodiments, the antenna pointing requests are transmitted 505 without encryption. However, in other embodiments, there may be a point-to-point encryption utilized between the customers 570 and the AOC 560.

After the AOC 560 receives the antenna pointing requests from the customers 570, the AOC 560 generates unencrypted AOC commands using the antenna pointing requests. The unencrypted AOC commands are commands that are used to command the gimballing mechanism for each antenna 521 associated with a customer 570 according to their respective antenna pointing requests. For example, if Customer #1 570 has specified that the Customer #1 assigned antenna 521 should be gimballed such that the latitude and longitude of the antenna beam of the Customer #1 assigned antenna 521 be located at Berlin, Germany, and the latitude and longitude of the antenna beam of the Customer #1 assigned antenna 521 is currently at London, England; the unencrypted AOC commands will specify that the gimballing mechanism (e.g., stepper motor) on the vehicle 510 gimbal (i.e. steer) the Customer #1 assigned antenna 521 accordingly (e.g., ten steps in azimuth and one step in elevation).

After the AOC 560 has generated the unencrypted AOC commands, the AOC 560 then encrypts the unencrypted AOC commands utilizing a second communication security (COMSEC) variety (e.g., COMSEC Variety 2) to generate encrypted AOC commands. It should be noted that the second COMSEC variety may include at least one encryption key and/or at least one algorithm (e.g., a Type 1 encryption algorithm or a Type 2 encryption algorithm).

The SOC 550 also encrypts unencrypted SOC commands using a first COMSEC variety (e.g., COMSEC Variety 1) to generate encrypted SOC commands. It should be noted that the unencrypted SOC commands are commands that are used to command the gimballing mechanism for each antenna 520 associated with the host (i.e. the SOC 550) according to the host's respective antenna pointing requests. Similar to the unencrypted AOC commands, the unencrypted SOC commands will specify that the gimballing mechanism (e.g., stepper motor) on the vehicle 510 gimbal (i.e. steer) each host assigned antenna 520 accordingly.

The SOC 550 will then transmit 506 (e.g., via a terrestrial link with internet protocol security (IPsec) over a virtual private network (VPN)) the encrypted SOC commands to the AOC 560. The AOC 560 will then transmit 507 (e.g., via a terrestrial link with internet protocol security (IPsec) over a virtual private network (VPN)) the encrypted AOC commands and the encrypted SOC commands to a ground antenna 530. It should be noted that, although in FIG. 5 the AOC 560 is depicted to be located far from the ground antenna 530, in some embodiments, the ground antenna 530 may be located right next to the AOC 560.

Then, the ground antenna 530 transmits 508 the encrypted AOC commands and the encrypted SOC commands to the vehicle 510. The ground antenna 530 transmits 508 the encrypted AOC commands and the encrypted SOC commands utilizing an out-of-band frequency band(s) (i.e. a frequency band(s) that is not the same frequency band(s) utilized by the antennas 520, 521 to transmit payload data). A command receiver 540 on the vehicle 510 receives the encrypted AOC commands and the encrypted SOC commands. It should be noted that in other embodiments, the disclosed system may employ more than one command receiver 540 than as is shown in FIG. 5.

The command receiver 540 then transmits 509 the encrypted AOC commands to a second communication security module 546. The second communication security module 546 decrypts the encrypted AOC commands utilizing the second COMSEC variety to generate the unencrypted AOC commands. It should be noted that the second communication security module 546 may comprise one or more modules. In addition, the second communication security module 546 may comprise one or more processors.

The command receiver 540 also transmits 522 the encrypted SOC commands to a first communication security module 545. The first communication security module 545 decrypts the encrypted SOC commands utilizing the first COMSEC variety to generate the unencrypted SOC commands. It should be noted that the first communication security module 545 may comprise one or more modules. In addition, the first communication security module 545 may comprise one or more processors.

The second communication security module 546 then transmits 501 the unencrypted AOC commands to at least one processor 555. Also, the first communication security module 545 then transmits 511 the unencrypted SOC commands to the processor 555.

The processor(s) 555 then generates customer antenna gimballing commands (e.g., machine commands for the gimballing mechanism stepper motor for each antenna) for each customer antenna 521 by using the unencrypted AOC commands. The processor(s) 555 also generates host antenna gimballing commands (e.g., machine commands for the gimballing mechanism stepper motor for each antenna) for each host antenna 520 by using the unencrypted SOC commands.

The processor(s) 555 then transmits 512 the customer antenna gimballing commands respectively to each customer antenna 521. The gimballing mechanism for each customer antenna 521 gimbals (i.e. steers) its respective customer antenna 521 according to its specific customer antenna gimballing commands. Each customer antenna 521 transmits payload data in its respective antenna beam to at least one customer receiving antenna 590 on the ground.

The processor(s) 555 also transmits 512 the host antenna gimballing commands respectively to each host antenna 520. The gimballing mechanism for each host antenna 520 gimbals (i.e. steers) its respective host antenna 520 according to its specific host antenna gimballing commands. Each host antenna 520 transmits payload data in its respective antenna beam to at least one host receiving antenna 585 on the ground.

It should be noted that in one or more embodiments, each customer antenna 521 and/or each host antenna 520 comprise a reflector and a gimballing mechanism to gimbal (i.e. steer) the reflector. In some embodiments, each customer antenna 521 and/or each host antenna 520 comprise at least two reflectors (i.e. a main reflector and at least one subreflector) and a gimballing mechanism to gimbal (i.e. steer) the main reflector. It should be noted that the main reflector and/or the subreflector(s) may be parabolic reflectors or shaped reflectors. In the embodiments where each customer antenna 521 and/or each host antenna 520 comprise two reflectors (i.e. a main reflector and one subreflector) and a gimballing mechanism to gimbal (i.e. steer) the main reflector, the reflectors (i.e. the main reflector and the subreflector) may be arranged in a Gregorian reflector antenna configuration or a Cassegrain antenna configuration. In other embodiments, each customer antenna 521 and/or each antenna 520 comprise at least one direct radiating horn antenna (e.g., an array of horn antennas) and a gimballing mechanism to gimbal (i.e. steer) the direct radiating horn antenna(s) (e.g., the gimballing mechanism gimbals the horns individually or the gimballing mechanism gimbals a platform, where the direct radiating horn antennas are mounted onto the platform).

Then, each customer antenna 521 and each host antenna 520 transmit 513 antenna gimballing telemetry (e.g., machine telemetry indicating that the antenna has been gimballed accordingly) from their respective gimballing mechanisms to the processor(s) 555. The processor(s) 555 then generates unencrypted telemetry by using the gimballing telemetry.

Then, the processor(s) 555 transmits 514 the unencrypted telemetry to the second communication security module 546. The second communication security module 546 encrypts the unencrypted telemetry using the second COMSEC variety (e.g., COMSEC variety 2) to generate encrypted telemetry. Then the second communication security module 546 transmits 515 the encrypted telemetry to a telemetry transmitter 565. It should be noted that in other embodiments, the disclosed system may employ more than one telemetry transmitter 565 than as is shown in FIG. 5.

Then, the telemetry transmitter 565 transmits 516 the encrypted telemetry to the ground antenna 530. The telemetry transmitter 565 transmits 516 the encrypted telemetry utilizing an out-of-band frequency band(s) (i.e. a frequency band(s) that is not the same frequency band(s) utilized by the antennas 520, 521 to transmit payload data).

The ground antenna 530 then transmits 517 (e.g., via a terrestrial link with internet protocol security (IPsec) over a virtual private network (VPN)) the encrypted telemetry to the AOC 560. The AOC 560 then decrypts the encrypted telemetry using the second COMSEC variety to generate the unencrypted telemetry. The AOC 560 then utilizes a database that comprises customer antenna decommutated information and does not comprise host antenna decommutated information (i.e. a database without host antenna decommutated information) to read to unencrypted telemetry to determine the telemetry data related to the antenna(s) 521 that is utilized by the customers 570. The AOC 560 then generates an antenna pointing location (e.g., the specific latitude and longitude location for the boresight of the antenna beam) for each antenna 521 associated with each customer 570 by using the unencrypted telemetry. Then, the AOC 560 transmits 519 (e.g., via a web browser over the internet (e.g., via a terrestrial link with internet protocol security (IPsec) over a virtual private network (VPN)) the antenna pointing location for each antenna 521 associated with each customer 570 respectively to each customer 570. Then, in one or more embodiments, the antenna pointing location (e.g., the specific latitude and longitude location for the boresight of the antenna beam) for each antenna 521 associated with each customer 570 will be displayed respectively on a computer screen 910 (refer to FIG. 9) associated with each customer 570.

The AOC 560 generates SOC telemetry (i.e. the telemetry data related to the antenna(s) 520 that is utilized by the SOC 550 (i.e. the host)) by removing all of the telemetry data related to the antenna(s) 521 that is utilized by the customers 570 from the unencrypted telemetry. Then, the AOC 560 transmits 518 (e.g., via a terrestrial link with internet protocol security (IPsec) over a virtual private network (VPN)) the SOC telemetry to the SOC 550.

FIGS. 6A, 6B, 6C, and 6D together show a flow chart for the disclosed method for secured multi-payload antennas operators operations utilizing an AOC uplink, a SOC, and a two COMSEC varieties for encryption, in accordance with at least one embodiment of the present disclosure. At the start 600 of the method, at least one customer transmits an antenna location pointing request for each of at least one antenna associated with each of at least one customer to an antenna operations center (AOC) 605. Then, the AOC generates unencrypted AOC commands using the antenna location pointing request for each of at least one antenna 610. The AOC then encrypts the unencrypted AOC commands utilizing a second communication security (COMSEC) variety to generate encrypted AOC commands 615. A satellite operation center (SOC) encrypts unencrypted SOC commands utilizing a first COMSEC variety to generate encrypted SOC commands, where the unencrypted SOC commands are related to at least one antenna associated with a host 620. The SOC then transmits the encrypted SOC commands to the AOC 625. Then, the AOC transmits the encrypted AOC commands and the encrypted SOC commands to a ground antenna 630. The ground antenna then transmits the encrypted AOC commands and the encrypted SOC commands to at least one command receiver on the vehicle 635.

Then, at least one command receiver on the vehicle transmits the encrypted SOC commands to a first communication security module on the vehicle 640. The first communication security module on the vehicle then decrypts the encrypted SOC commands utilizing the first COMSEC variety to generate the unencrypted SOC commands 645. Then, the first communication security module on the vehicle transmits the unencrypted SOC commands to at least one processor on the vehicle 650.

At least one command receiver on the vehicle also transmits the encrypted AOC commands to a second communication security module on the vehicle 655. The second communication security module on the vehicle then decrypts the AOC commands utilizing the second COMSEC variety to generate the unencrypted AOC commands 660. The second communication security module on the vehicle then transmits the unencrypted AOC commands to at least one processor on the vehicle 665. At least one processor then generates customer antenna gimballing commands for each respective at least one antenna associated with each of at least one customer by using the unencrypted AOC commands 670. Also, at least one processor generates host antenna gimballing commands for each respective at least one antenna associated with the host by using the unencrypted SOC commands 675. Then, at least one processor transmits the customer antenna gimballing commands respectively to each of at least one antenna associated with each of at least one customer 680. Also, at least one processor transmits the host antenna gimballing commands respectively to each of at least one antenna associated with the host 681. Then, each of at least one antenna associated with each of at least one customer is respectively gimballed by using the customer antenna gimballing commands 682. Also, each of at least one antenna associated with the host is respectively gimballed by using the host antenna gimballing commands 683.

Then, each of at least one antenna associated with each of at least one customer and each of at least one antenna associated with the host transmits antenna gimballing telemetry to at least one processor 684. At least one processor then generates unencrypted telemetry by using the antenna gimballing telemetry 685. Then, at least one processor transmits the unencrypted telemetry to the second communication security module 686. The second communication security module then encrypts the unencrypted telemetry using the second COMSEC variety to generate encrypted telemetry 687. Then, the second communication security module transmits the encrypted telemetry to at least one telemetry transmitter 688. At least one telemetry transmitter then transmits the encrypted telemetry to the ground antenna 689.

Then, the ground antenna transmits the encrypted telemetry to the AOC 690. The AOC then decrypts the encrypted telemetry using the second COMSEC variety to generate the unencrypted telemetry 691. Then, the AOC generates an antenna pointing location telemetry for each of at least one antenna associated with each of at least one customer by using the unencrypted telemetry 692. Then, the AOC transmits the antenna pointing location telemetry for each of at least one antenna associated with each of at least one customer respectively to each of at least one customer 693. The AOC then generates SOC telemetry by using the unencrypted telemetry. The AOC then transmits the SOC telemetry to the SOC 695. Then, the method ends 696.

FIG. 7 is a diagram 700 showing the disclosed system for secured multi-payload antennas operators operations utilizing a SOC 750 uplink 708 and a single COMSEC variety (e.g., COMSEC variety 1) for encryption, in accordance with at least one embodiment of the present disclosure. In this figure, a vehicle 710, a satellite operation center (SOC) 750, and multiple customers 770 (i.e. n number of customers, where n is greater than or equal to one) are shown. The customers 770 have each leased at least one antenna 721 on the vehicle 710 from the owner of a satellite (i.e. the SOC 750 (i.e. the host)). It should be noted that in some embodiments, the customers 770 may lease all of the antennas 720, 721 on the vehicle 710 from the owner of a satellite (i.e. the SOC 750). In these embodiments, the SOC commands, which will be discussed in further detail below, will simply be unoperational commands or nonexistent.

Various different types of vehicles 710 may be employed for the vehicle 710 including, but not limited to, an airborne vehicle. And, various different types of airborne vehicles may be employed for the vehicle 710 including, but not limited to, a satellite, an aircraft, an unmanned aerial vehicle (UAV), and a space plane. Additionally, various different types of satellites may be employed for the vehicle 710 including, but not limited to geosynchronous earth orbit (GEO) satellites, medium earth orbit (MEO), lower earth orbit (LEO), and highly elliptical orbit (HEO) satellites.

During operation, each customer 770 generates an antenna pointing request for each antenna 721 associated with the customer 770. For example, Customer #1 770 generates an antenna pointing request for the Customer #1 assigned antenna 721 on the vehicle 710. There may be various different ways the customer 770 generates the antenna pointing request. In one or more embodiments, the customer 770 utilizes a graphical user interface (GUI) (e.g., at the customer's 770 remote location) to select (or input) a specific latitude and longitude location for the boresight of the antenna beam of for each antenna on the vehicle 710 that the customer is leasing. One example GUI that may be employed is shown in FIG. 9. A discussion regarding the details of the GUI in FIG. 9 can be found above.

After each customer 770 generates an antenna pointing request (e.g., a specific latitude and longitude location for the boresight of the antenna beam) for each antenna 721 associated with the customer 770, each customer 770 then transmits 705 (e.g., via a web browser over the internet (e.g., via a terrestrial link with internet protocol security (IPsec) over a virtual private network (VPN)) their antenna pointing requests to a secure portion of the SOC 750. In one or more embodiments, the antenna pointing requests are transmitted 705 without encryption. However, in other embodiments, there may be a point-to-point encryption utilized between the customers 770 and the SOC 750.

After the SOC 750 receives the antenna pointing requests from the customers 770, in a secure portion of the SOC 750, the SOC 750 generates unencrypted customer commands using the antenna pointing requests. The unencrypted customer commands are commands that are used to command the gimballing mechanism for each antenna 721 associated with a customer 770 according to their respective antenna pointing requests. For example, if Customer #1 770 has specified that the Customer #1 assigned antenna 721 should be gimballed such that the latitude and longitude of the antenna beam of the Customer #1 assigned antenna 721 be located at Berlin, Germany, and the latitude and longitude of the antenna beam of the Customer #1 assigned antenna 721 is currently at London, England; the unencrypted customer commands will specify that the gimballing mechanism (e.g., stepper motor) on the vehicle 710 gimbal (i.e. steer) the Customer #1 assigned antenna 721 accordingly (e.g., ten steps in azimuth and one step in elevation).

After the SOC 750 has generated the unencrypted customer commands, in a secure portion of the SOC 750, the SOC 750 then encrypts the unencrypted customer commands utilizing a communication security (COMSEC) variety to generate encrypted customer commands. It should be noted that the COMSEC variety may include at least one encryption key and/or at least one algorithm (e.g., a Type 1 encryption algorithm or a Type 2 encryption algorithm).

The SOC 750 also encrypts unencrypted SOC commands using the COMSEC variety to generate encrypted SOC commands. It should be noted that the unencrypted SOC commands are commands that are used to command the gimballing mechanism for each antenna 720 associated with the host (i.e. the SOC 750) according to the host's respective antenna pointing requests. Similar to the unencrypted customer commands, the unencrypted SOC commands will specify that the gimballing mechanism (e.g., stepper motor) on the vehicle 710 gimbal (i.e. steer) each host assigned antenna 720 accordingly.

The SOC 750 will then transmit 707 (e.g., via a terrestrial link with Internet protocol security (IPsec) over a virtual private network (VPN)) the encrypted customer commands and the encrypted SOC commands to a ground antenna 730. It should be noted that, although in FIG. 7 the SOC 750 is depicted to be located far from the ground antenna 730, in some embodiments, the ground antenna 730 may be located right next to the SOC 750.

Then, the ground antenna 730 transmits 708 the encrypted customer commands and the encrypted SOC commands to the vehicle 710. The ground antenna 730 transmits 708 the encrypted customer commands and the encrypted SOC commands utilizing an out-of-band frequency band(s) (i.e. a frequency band(s) that is not the same frequency band(s) utilized by the antennas 720, 721 to transmit payload data). A command receiver 740 on the vehicle 710 receives the encrypted customer commands and the encrypted SOC commands. It should be noted that in other embodiments, the disclosed system may employ more than one command receiver 740 than as is shown in FIG. 7.

The command receiver 740 then transmits 709 the encrypted customer commands and the encrypted SOC commands to a communication security module 745. The communication security module 745 decrypts the encrypted customer commands utilizing the COMSEC variety to generate the unencrypted customer commands. Also, the communication security module 745 decrypts the encrypted SOC commands utilizing the COMSEC variety (e.g., COMSEC Variety 1) to generate the unencrypted SOC commands. It should be noted that the communication security module 745 may comprise one or more modules. In addition, the communication security module 745 may comprise one or more processors.

The communication security module 745 then transmits 701 the unencrypted customer commands and the unencrypted SOC commands to at least one processor 755. The processor(s) 755 then generates customer antenna gimballing commands (e.g., machine commands for the gimballing mechanism stepper motor for each antenna) for each customer antenna 721 by using the unencrypted customer commands. The processor(s) 755 also generates host antenna gimballing commands (e.g., machine commands for the gimballing mechanism stepper motor for each antenna) for each host antenna 720 by using the unencrypted SOC commands.

The processor(s) 755 then transmits 712 the customer antenna gimballing commands respectively to each customer antenna 721. The gimballing mechanism for each customer antenna 721 gimbals (i.e. steers) its respective customer antenna 721 according to its specific customer antenna gimballing commands. Each customer antenna 721 transmits payload data in its respective antenna beam to at least one customer receiving antenna 790 on the ground.

The processor(s) 755 also transmits 712 the host antenna gimballing commands respectively to each host antenna 720. The gimballing mechanism for each host antenna 720 gimbals (i.e. steers) its respective host antenna 720 according to its specific host antenna gimballing commands. Each host antenna 720 transmits payload data in its respective antenna beam to at least one host receiving antenna 785 on the ground.

It should be noted that in one or more embodiments, each customer antenna 721 and/or each host antenna 720 comprise a reflector and a gimballing mechanism to gimbal (i.e. steer) the reflector. In some embodiments, each customer antenna 721 and/or each host antenna 720 comprise at least two reflectors (i.e. a main reflector and at least one subreflector) and a gimballing mechanism to gimbal (i.e. steer) the main reflector. It should be noted that the main reflector and/or the subreflector(s) may be parabolic reflectors or shaped reflectors. In the embodiments where each customer antenna 721 and/or each host antenna 720 comprise two reflectors (i.e. a main reflector and one subreflector) and a gimballing mechanism to gimbal (i.e. steer) the main reflector, the reflectors (i.e. the main reflector and the subreflector) may be arranged in a Gregorian reflector antenna configuration or a Cassegrain antenna configuration. In other embodiments, each customer antenna 721 and/or each host antenna 720 comprise at least one direct radiating horn antenna (e.g., an array of horn antennas) and a gimballing mechanism to gimbal (i.e. steer) the direct radiating horn antenna(s) (e.g., the gimballing mechanism gimbals the horns individually or the gimballing mechanism gimbals a platform, where the direct radiating horn antennas are mounted onto the platform).

Then, each customer antenna 721 and each host antenna 720 transmit 713 antenna gimballing telemetry (e.g., machine telemetry indicating that the antenna has been gimballed accordingly) from their respective gimballing mechanisms to the processor(s) 755. The processor(s) 755 then generates unencrypted telemetry by using the gimballing telemetry.

Then, the processor(s) 755 transmits 714 the unencrypted telemetry to the communication security module 745. The communication security module 745 encrypts the unencrypted telemetry using the COMSEC variety (e.g., COMSEC variety 1) to generate encrypted telemetry. Then the communication security module 745 transmits 715 the encrypted telemetry to a telemetry transmitter 765. It should be noted that in other embodiments, the disclosed system may employ more than one telemetry transmitter 765 than as is shown in FIG. 7.

Then, the telemetry transmitter 765 transmits 716 the encrypted telemetry to the ground antenna 730. The telemetry transmitter 765 transmits 716 the encrypted telemetry utilizing an out-of-band frequency band(s) (i.e. a frequency band(s) that is not the same frequency band(s) utilized by the antennas 720, 721 to transmit payload data).

The ground antenna 730 then transmits 717 (e.g., via a terrestrial link with internet protocol security (IPsec) over a virtual private network (VPN)) the encrypted telemetry to the SOC 750. The SOC 750 then decrypts the encrypted telemetry using the COMSEC variety to generate the unencrypted telemetry. The SOC 750 then utilizes a database that comprises host antenna decommutated information and does not comprise customer antenna decommutated information (i.e. a database without customer antenna decommutated information) to read to unencrypted telemetry to determine the telemetry data related to the antenna(s) 720 that is utilized by the SOC 750 (i.e. the host).

Then, in a secure portion of the SOC 750, the SOC 750 utilizes a database that comprises customer antenna decommutated information and does not comprise host antenna decommutated information (i.e. a database without host antenna decommutated information) to read to unencrypted telemetry to determine the telemetry data related to the antenna(s) 721 that is utilized by the customers 770. In a secure portion of the SOC 750, the SOC 750 then generates an antenna pointing location (e.g., the specific latitude and longitude location for the boresight of the antenna beam) for each antenna 721 associated with each customer 770 by using the unencrypted telemetry. Then, the SOC 750 transmits 719 (e.g., via a web browser over the internet (e.g., via a terrestrial link with internet protocol security (IPsec) over a virtual private network (VPN)) the antenna pointing location for each antenna 721 associated with each customer 770 respectively to each customer 770. Then, in one or more embodiments, the antenna pointing location (e.g., the specific latitude and longitude location for the boresight of the antenna beam) for each antenna 721 associated with each customer 770 will be displayed respectively on a computer screen 910 (refer to FIG. 9) associated with each customer 770.

FIGS. 8A, 8B, 8C, and 8D together show a flow chart for the disclosed method for secured multi-payload antennas operators operations utilizing a SOC uplink and a single COMSEC variety for encryption, in accordance with at least one embodiment of the present disclosure. At the start 800 of the method, at least one customer transmits an antenna location pointing request for each of at least one antenna associated with each of at least one customer to a satellite operation center (SOC) 805. Then, the SOC generates unencrypted customer commands using the antenna pointing location request for each of at least one antenna 810. The SOC then encrypts the unencrypted customer commands utilizing a communication security (COMSEC) variety to generate encrypted customer commands 815. The SOC also encrypts unencrypted SOC commands utilizing the COMSEC variety to generate encrypted SOC commands, where the unencrypted SOC commands are related to at least one antenna associated with a host 820. Then, the SOC transmits the encrypted customer commands and the encrypted SOC commands to a ground antenna 825. The ground antenna then transmits the encrypted customer commands and the encrypted SOC commands to at least one command receiver on a vehicle 830.

Then, at least one command receiver on the vehicle transmits the encrypted customer commands and the encrypted SOC commands to a communication security module on the vehicle 835. The communication security module on the vehicle then decrypts the customer commands utilizing the COMSEC variety to generate the unencrypted customer commands 840. Also, the communication security module on the vehicle decrypts the encrypted SOC commands utilizing the COMSEC variety to generate the unencrypted SOC commands 845. Then, the communication security module on the vehicle transmits the unencrypted customer commands and the unencrypted SOC commands to at least one processor on the vehicle 850. At least one processor then generates customer antenna gimballing commands for each respective at least one antenna associated with each of at least one customer by using the unencrypted customer commands 855. At least one processor also generates host antenna gimballing commands for each respective at least one antenna associated with the host by using the unencrypted SOC commands 860. Then, at least one processor transmits the customer antenna gimballing commands respectively to each of at least one antenna associated with each of at least one customer 865. At least one processor then transmits the host antenna gimballing commands respectively to each of at least one antenna associated with the host 870. Then, each of at least one antenna associated with each of at least one customer is respectively gimballed by using the customer antenna gimballing commands 875. Also, each of at least one antenna associated with the host is respectively gimballed using the host antenna gimballing commands 880.

Then, each of at least one antenna associated with each of at least one customer and each of at least one antenna associated with the host transmit antenna gimballing telemetry to at least one processor 881. Then, at least one processor generates unencrypted telemetry by using the antenna gimballing telemetry 882. At least one processor then transmits the unencrypted telemetry to the communication security module 883. The communication security module then encrypts the unencrypted telemetry using the COMSEC variety to generate encrypted telemetry 884. Then, the communication security module transmits the encrypted telemetry to at least one telemetry transmitter 885. At least one telemetry transmitter then transmits the encrypted telemetry to the ground antenna 886.

Then, the ground antenna transmits the encrypted telemetry to the SOC 887. The SOC then decrypts the encrypted telemetry by using the COMSEC variety to generate the unencrypted telemetry 888. Then, the SOC generates an antenna pointing location for each of at least one antenna associated with each of at least one customer by using the unencrypted telemetry 889. The SOC then transmits the antenna pointing location for each of at least one antenna associated with each of at least one customer respectively to each of at least one customer 890. Then, the method ends 895.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for secured multi-payload antennas operators operations, the method comprising:

transmitting, by at least one customer, an antenna location pointing request for each of at least one antenna associated with each of the at least one customer to an antenna operations center (AOC);

generating, by the AOC, unencrypted AOC commands using the antenna location pointing request for each of the at least one antenna;

transmitting, by the AOC, the unencrypted AOC commands to a satellite operation center (SOC);

encrypting, by the SOC, the unencrypted AOC commands utilizing a communication security (COMSEC) variety to generate encrypted AOC commands;

encrypting, by the SOC, unencrypted SOC commands utilizing the COMSEC variety to generate encrypted SOC commands, wherein the unencrypted SOC commands are related to at least one antenna associated with a host;

transmitting, by the SOC, the encrypted AOC commands and the encrypted SOC commands to a ground antenna;

transmitting, by the ground antenna, the encrypted AOC commands and the encrypted SOC commands to a vehicle;

decrypting, by a communication security module on the vehicle, the encrypted AOC commands utilizing the COMSEC variety to generate the unencrypted AOC commands;

decrypting, by the communication security module on the vehicle, the encrypted SOC commands utilizing the COMSEC variety to generate the unencrypted SOC commands;

generating, by at least one processor, customer antenna gimballing commands for each respective the at least one antenna associated with each of the at least one customer by using the unencrypted AOC commands;

generating, by the at least one processor, host antenna gimballing commands for each respective the at least one antenna associated with the host by using the unencrypted SOC commands;

gimballing respectively each of the at least one antenna associated with each of the at least one customer by using the customer antenna gimballing commands;

gimballing respectively each of the at least one antenna associated with the host by using the host antenna gimballing commands;

generating, by the at least one processor, unencrypted telemetry by using antenna gimballing telemetry;

encrypting, by the communication security module, the unencrypted telemetry using the COMSEC variety to generate encrypted telemetry;

transmitting, by the vehicle, the encrypted telemetry to the ground antenna;

transmitting, by the ground antenna, the encrypted telemetry to the SOC;

decrypting, by the SOC, the encrypted telemetry utilizing the COMSEC variety to generate the unencrypted telemetry;

transmitting, by the SOC, the unencrypted telemetry to the AOC;

generating, by the AOC, an antenna pointing location for each of the at least one antenna associated with each of the at least one customer by using the unencrypted telemetry; and transmitting, by the AOC, the antenna pointing location for each of the at least one antenna associated with each of the at least one customer respectively to each of the at least one customer.

2. The method of claim 1, wherein the at least one antenna associated with each of the at least one customer comprises at least one antenna reflector.

3. The method of claim 1, wherein the at least one antenna associated with the host comprises at least one antenna reflector.

4. The method of claim 1, wherein the vehicle is one of a satellite, an aircraft, an unmanned aerial vehicle (UAV), or a space plane.

5. The method of claim 1, wherein the COMSEC variety comprises at least one of at least one encryption key or at least one algorithm.

6. A method for secured multi-payload antennas operators operations, the method comprising:

transmitting, by at least one customer, an antenna location pointing request for each of at least one antenna associated with each of the at least one customer to a client;

generating, by the client, unencrypted customer commands using the antenna location pointing request for each of the at least one antenna;

transmitting, by the client, the unencrypted customer commands to a satellite operation center (SOC) primary server;

encrypting, by the SOC primary server, the unencrypted customer commands utilizing a communication security (COMSEC) variety to generate encrypted customer commands;

encrypting, by the SOC primary server, unencrypted SOC commands utilizing the COMSEC variety to generate encrypted SOC commands, wherein the unencrypted SOC commands are related to at least one antenna associated with a host;

transmitting, by the SOC primary server, the encrypted customer commands and the encrypted SOC commands to a ground antenna;

transmitting, by the ground antenna, the encrypted customer commands and the encrypted SOC commands to a vehicle;

decrypting, by a communication security module on the vehicle, the encrypted customer commands utilizing the COMSEC variety to generate the unencrypted customer commands;

decrypting, by the communication security module on the vehicle, the encrypted SOC commands utilizing the COMSEC variety to generate the unencrypted SOC commands;

generating, by at least one processor, customer antenna gimballing commands for each respective the at least one antenna associated with each of the at least one customer by using the unencrypted customer commands;

generating, by the at least one processor, host antenna gimballing commands for each respective the at least one antenna associated with the host by using the unencrypted SOC commands;

gimballing respectively each of the at least one antenna associated with each of the at least one customer by using the customer antenna gimballing commands;

gimballing respectively each of the at least one antenna associated with the host by using the host antenna gimballing commands;

generating, by the at least one processor, unencrypted telemetry by using antenna gimballing telemetry;

encrypting, by the communication security module, the unencrypted telemetry using the COMSEC variety to generate encrypted telemetry;

transmitting, by the vehicle, the encrypted telemetry to the ground antenna;

transmitting, by the ground antenna, the encrypted telemetry to the SOC primary server;

decrypting, by the SOC primary server, the encrypted telemetry utilizing the COMSEC variety to generate the unencrypted telemetry;

transmitting, by the SOC primary server, the unencrypted telemetry to the client;

generating, by the client, an antenna pointing location for each of the at least one antenna associated with each of the at least one customer by using the unencrypted telemetry; and transmitting, by the client, the antenna pointing location for each of the at least one antenna associated with each of the at least one customer respectively to each of the at least one customer.

7. The method of claim 6, wherein the at least one antenna associated with each of the at least one customer comprises at least one antenna reflector.

8. The method of claim 6, wherein the at least one antenna associated with the host comprises at least one antenna reflector.

9. The method of claim 6, wherein the vehicle is one of a satellite, an aircraft, an unmanned aerial vehicle (UAV), or a space plane.

10. The method of claim 6, wherein the COMSEC variety comprises at least one of at least one encryption key or at least one algorithm.

11. A method for secured multi-payload antennas operators operations, the method comprising:

transmitting, by at least one customer, an antenna location pointing request for each of at least one antenna associated with each of the at least one customer to an antenna operations center (AOC);

generating, by the AOC, unencrypted AOC commands using the antenna location pointing request for each of the at least one antenna;

encrypting, by the AOC, the unencrypted AOC commands utilizing a second communication security (COMSEC) variety to generate encrypted AOC commands;

encrypting, by a satellite operation center (SOC), unencrypted SOC commands utilizing a first COMSEC variety to generate encrypted SOC commands, wherein the unencrypted SOC commands are related to at least one antenna associated with a host;

transmitting, by the SOC, the encrypted SOC commands to the AOC;
transmitting, by the AOC, the encrypted AOC commands and the encrypted SOC commands to a ground antenna;
transmitting, by the ground antenna, the encrypted AOC commands and the encrypted SOC commands to a vehicle;
decrypting, by a first communication security module on the vehicle, the encrypted SOC commands utilizing the first COMSEC variety to generate the unencrypted SOC commands;
decrypting, by a second communication security module on the vehicle, the encrypted AOC commands utilizing the second COMSEC variety to generate the unencrypted AOC commands;
generating, by at least one processor, customer antenna gimballing commands for each respective the at least one antenna associated with each of the at least one customer by using the unencrypted AOC commands;
generating, by the at least one processor, host antenna gimballing commands for each respective the at least one antenna associated with the host by using the unencrypted SOC commands;
gimballing respectively each of the at least one antenna associated with each of the at least one customer by using the customer antenna gimballing commands;
gimballing respectively each of the at least one antenna associated with the host by using the host antenna gimballing commands;
generating, by the at least one processor, unencrypted telemetry by using the antenna gimballing telemetry;
encrypting, by the second communication security module, the unencrypted telemetry using the second COMSEC variety to generate encrypted telemetry;
transmitting, by the vehicle, the encrypted telemetry to the ground antenna;
transmitting, by the ground antenna, the encrypted telemetry to the AOC;
decrypting, by the AOC, the encrypted telemetry using the second COMSEC variety to generate the unencrypted telemetry;
generating, by the AOC, an antenna pointing location for each of the at least one antenna associated with each of the at least one customer by using the unencrypted telemetry;
transmitting, by the AOC, the antenna pointing location for each of the at least one antenna associated with each of the at least one customer respectively to each of the at least one customer;
generating, by the AOC, SOC telemetry by using the unencrypted telemetry; and
transmitting, by the AOC, the SOC telemetry to the SOC.

12. The method of claim 11, wherein the at least one antenna associated with each of the at least one customer comprises at least one antenna reflector.

13. The method of claim 11, wherein the at least one antenna associated with the host comprises at least one antenna reflector.

14. The method of claim 11, wherein the vehicle is one of a satellite, an aircraft, an unmanned aerial vehicle (UAV), or a space plane.

15. The method of claim 11, wherein the first COMSEC variety comprises at least one of at least one encryption key or at least one algorithm; and
the second COMSEC variety comprises at least one of at least one encryption key or at least one algorithm.

16. A method for secured multi-payload antennas operators operations, the method comprising:
transmitting, by at least one customer, an antenna location pointing request for each of at least one antenna associated with each of the at least one customer to a satellite operation center (SOC);
generating, by the SOC, unencrypted customer commands using the antenna location pointing request for each of the at least one antenna;
encrypting, by the SOC, the unencrypted customer commands utilizing a communication security (COMSEC) variety to generate encrypted customer commands;
encrypting, by the SOC, unencrypted SOC commands utilizing the COMSEC variety to generate encrypted SOC commands,
wherein the unencrypted SOC commands are related to at least one antenna associated with a host;
transmitting, by the SOC, the encrypted customer commands and the encrypted SOC commands to a ground antenna;
transmitting, by the ground antenna, the encrypted customer commands and the encrypted SOC commands to a vehicle;
decrypting, by a communication security module on the vehicle, the encrypted customer commands utilizing the COMSEC variety to generate the unencrypted customer commands;
decrypting, by the communication security module on the vehicle, the encrypted SOC commands utilizing the COMSEC variety to generate the unencrypted SOC commands;
generating, by at least one processor, customer antenna gimballing commands for each respective the at least one antenna associated with each of the at least one customer by using the unencrypted customer commands;
generating, by the at least one processor, host antenna gimballing commands for each respective the at least one antenna associated with the host by using the unencrypted SOC commands;
gimballing respectively each of the at least one antenna associated with each of the at least one customer by using the customer antenna gimballing commands;
gimballing respectively each of the at least one antenna associated with the host by using the host antenna gimballing commands;
generating, by the at least one processor, unencrypted telemetry by using the antenna gimballing telemetry;
encrypting, by the communication security module, the unencrypted telemetry using the COMSEC variety to generate encrypted telemetry;
transmitting, by the vehicle, the encrypted telemetry to the ground antenna;
transmitting, by the ground antenna, the encrypted telemetry to the SOC;
decrypting, by the SOC, the encrypted telemetry by using the COMSEC variety to generate the unencrypted telemetry;
generating, by the SOC, an antenna pointing location for each of the at least one antenna associated with each of the at least one customer by using the unencrypted telemetry; and
transmitting, by the SOC, the antenna pointing location for each of the at least one antenna associated with each of the at least one customer respectively to each of the at least one customer.

17. The method of claim 16, wherein the at least one antenna associated with each of the at least one customer comprises at least one antenna reflector.

18. The method of claim 16, wherein the at least one antenna associated with the host comprises at least one antenna reflector.

19. The method of claim 16, wherein the vehicle is one of a satellite, an aircraft, an unmanned aerial vehicle (UAV), or a space plane.

20. The method of claim 16, wherein the COMSEC variety comprises at least one of at least one encryption key or at least one algorithm.

* * * * *